(12) United States Patent
Ishida et al.

(10) Patent No.: US 7,784,706 B2
(45) Date of Patent: Aug. 31, 2010

(54) FACILITY OPERATING METHOD AND APPARATUS, FACILITY OPERATING SYSTEM, MANAGING METHOD AND APPARATUS, AND FACILITY

(75) Inventors: Koichi Ishida, Osaka (JP); Kenji Nagashima, Kusatsu (JP); Yoshihiro Nakagawa, Kusatsu (JP); Hidetaka Nakane, Kusatsu (JP); Nobuhiro Imada, Osaka (JP); Akira Murai, Osaka (JP); Mitsuhiko Yamamoto, Osaka (JP); Naofumi Takenaka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/240,668

(22) PCT Filed: Apr. 3, 2001

(86) PCT No.: PCT/JP01/02905

§ 371 (c)(1),
(2), (4) Date: Jul. 7, 2003

(87) PCT Pub. No.: WO01/75373

PCT Pub. Date: Oct. 11, 2001

(65) Prior Publication Data

US 2004/0035125 A1 Feb. 26, 2004

(30) Foreign Application Priority Data

Apr. 3, 2000 (JP) ............... 2000-100499
Jun. 13, 2000 (JP) ............... 2000-176472

(51) Int. Cl.
*G06F 9/00* (2006.01)
(52) U.S. Cl. .................. 236/51; 705/7; 705/8
(58) Field of Classification Search .......... 236/51, 236/94; 62/175, 201, 59, 126, 129; 165/208, 165/209, 236; 374/32, 39, 40, 41; 705/7, 705/8
See application file for complete search history.

(56) References Cited

U.S. PATENT DOCUMENTS 4,306,293 A * 12/1981 Marathe .............. 374/40

(Continued)

FOREIGN PATENT DOCUMENTS

EP 0883050 A1 12/1998

(Continued)

OTHER PUBLICATIONS

European Supplemental Search Report for Corresponding Application No. 01917816.9 - 1268 / 1275908 PCT/JP102905. Dated Oct. 14, 2009.

*Primary Examiner*—Marc E Norman
(74) *Attorney, Agent, or Firm*—Smith, Gambrell & Russell, LLP

(57) ABSTRACT

A facility working apparatus includes objects (1), a management apparatus (2), and an exterior information source (3) such as a weather company, a power company or the like. Each object (1) and the management apparatus (2), the exterior information source (3) and the management apparatus (2) are connected via a network. Each object (1) includes a facility (1*a*) such as a heat storage air conditioner, power storage air conditioner or the like, and a controlling apparatus (1*b*) for working and controlling the facility (1*a*) and for extracting facility information of the facility (1*a*) and user determination information. The management apparatus (2) includes a database (2*a*) and a data processing section (2*b*). The data processing section (2*b*) in the management apparatus (2) carries out processing based upon facility information, user determination data, and exterior information, and generates working and controlling information. The information is transferred to corresponding controlling apparatus (1*b*). Performance required for the control apparatus for controlling each facility can be suppressed to be low performance, and sufficient working accuracy of each facility can be maintained.

3 Claims, 10 Drawing Sheets

U.S. PATENT DOCUMENTS

| | | | | |
|---|---|---|---|---|
| 4,591,988 | A * | 5/1986 | Klima et al. | 374/39 |
| 5,279,458 | A * | 1/1994 | DeWolf et al. | 236/47 |
| 5,586,446 | A * | 12/1996 | Torimitsu | 62/126 |
| 5,646,858 | A * | 7/1997 | Schrock et al. | 165/11.1 |
| 5,647,223 | A * | 7/1997 | Wada et al. | 62/175 |
| 5,651,264 | A * | 7/1997 | Lo et al. | 62/230 |
| 5,682,949 | A * | 11/1997 | Ratcliffe et al. | 165/209 |
| 5,778,683 | A * | 7/1998 | Drees et al. | 62/59 |
| 5,802,862 | A * | 9/1998 | Eiermann | 62/173 |
| 5,853,123 | A * | 12/1998 | Okano et al. | 236/51 |
| 6,009,939 | A * | 1/2000 | Nakanishi et al. | 165/209 |
| 6,098,893 | A * | 8/2000 | Berglund et al. | 236/51 |
| 6,334,317 | B1 * | 1/2002 | Bougauchi et al. | 62/127 |
| 6,970,539 | B2 * | 11/2005 | Yamamoto et al. | 379/102.05 |

FOREIGN PATENT DOCUMENTS

| | | |
|---|---|---|
| GB | 2139783 A | 11/1984 |
| GB | 2308679 A | 7/1997 |
| JP | 61-83836 | 4/1986 |
| JP | 5-33993 | 2/1993 |
| JP | 8-265868 | 10/1996 |
| WO | 99/22284 A | 5/1999 |

* cited by examiner

FACILITY OPERATING METHOD AND APPARATUS, FACILITY OPERATING SYSTEM, MANAGING METHOD AND APPARATUS, AND FACILITY

TECHNICAL FIELD

The present invention relates to a working method for facility, apparatus thereof, working system for facility, management method, apparatus thereof, and facility. More particularly, the present invention relates to a working method for facility for working each facility based upon transmission data from a management center which is coupled via a network to control apparatus each controlling each of a plurality of facilities, apparatus thereof, working system for facility, management method applied to those, apparatus thereof, and facility.

RELATED ART

From the past, when various facilities are worked, it is generally performed that a control apparatus is provided for each facility, control software and control data necessary for working each facility are incorporated in the control apparatus, and each facility is worked by the control apparatus. Wherein, a heat storage air conditioner, power storage air conditioner, power management system for home, and the like are exemplified as the facility.

When each facility is worked by employing the above arrangement, an apparatus having ability for carrying out processing for working without disadvantages should be employed as the control apparatus. Therefore, the control apparatus becomes expensive.

Updating of the control software and control data is necessary, therefore operation for those updating becomes complicated.

Specifically, when the facility is a heat storage air conditioner or power storage air conditioner, estimating operation of tomorrow's air conditioning load from today's air conditioning load, controlling operation of heat storage operation or power storage operation based upon the estimated air conditioning load, and controlling operation of heat radiating operation or discharging operation are necessary. When optimum heat storage operation or power storage operation is to be carried out, it becomes necessary that estimation accuracy of air conditioning load is improved. In this case, not only the today's air conditioning load but also individual information (information related to a space objected for air conditioning) and external factors (locally characteristic factors such as external air temperature, sunshine, humidity, and the like) should be taken into consideration, therefore control apparatus with high performance become necessary. As a result, a heat storage air conditioner or power storage air conditioner becomes expensive in its entirety.

When the facility is a facility other than the heat storage air conditioner or the power storage air conditioner, similar disadvantages arise.

The present invention was made in view of the above problems.

It is an object of the present invention to offer a working method for facility in which performance required for controlling apparatus for controlling each facility can be suppressed in a low level and which realizes sufficient working accuracy, apparatus thereof, working system for facility, and management method, apparatus thereof, and facility which are applied to those.

DISCLOSURE OF THE INVENTION

A working method includes a plurality of facilities and a management center, and which extracts information of each facility, transfers the extracted facility information to the management center via a network, generates facility working information by carrying out processing based upon the facility information and external information given from exterior in the management center and transfers the facility working information to corresponding facility via the network.

A working method includes a plurality of facilities and a management center, and which controls each facility using corresponding controlling apparatus, extracts information of each facility using the controlling apparatus, transfers the facility information extracted by the controlling apparatus to the management center via a network, the facility information being added discrimination information, generates facility working information by carrying out processing based upon the facility information and external information given from exterior in the management center and transfers the facility working information to corresponding facility via the network.

A working method generates facility working information by carrying out processing based upon the facility information and external information given from exterior in the management apparatus.

A working method employs a heat storage air conditioner or power storage air conditioner, as the facility, and which generates estimation values of air conditioning load by carrying out processing based upon the facility information and external information given from exterior in the management apparatus.

A working method works a plurality of facilities using the controlling apparatus, and transfers necessary facility working controlling software to corresponding controlling apparatus via the network by carrying out processing based upon the facility information in the management apparatus.

A working method manages power of at least one facility using the controlling apparatus, generates power management software by carrying out processing based upon the facility information and user determination information in the management apparatus, and transfers the power management software to corresponding controlling apparatus.

A working method for calculates a difference between a working cost under a condition that a facility is worked without using facility working information and a working cost under a condition that a facility is worked using facility working information, and lays a charge which is a predetermined percentage with respect to the calculated difference.

A working apparatus includes a plurality of facilities and a management center, and a network which transfers facility information to the management center and transfers facility working information to corresponding facility from the management center, and which employs an apparatus for generating facility working information by carrying out processing based upon the facility information and external information given from exterior as the management center.

A working apparatus includes a plurality of facilities and a management center, and a controlling apparatus for controlling each facility and extracting information of each facility, and a network for transferring the facility information extracted by the controlling apparatus to the management center via a network, the facility information being added discrimination information, and for transferring the facility working information to corresponding facility from the management center, and which employs an apparatus for generating facility working information by carrying out processing based upon the facility information and external information given from exterior as the management center.

A working apparatus employs an apparatus for generating facility working information by carrying out processing based upon the facility information and external information given from exterior as the management apparatus.

A working apparatus employs a heat storage air conditioner or power storage air conditioner as the facility, and which employs an apparatus for generating estimation values of air conditioning load by carrying out processing based upon the facility information and external information given from exterior as the management apparatus.

A working apparatus employs an apparatus for working and controlling a plurality of facilities as the controlling apparatus, and employs an apparatus for transferring necessary facility working controlling software to corresponding controlling apparatus via the network by carrying out processing based upon the facility information as the management apparatus.

A working apparatus employs an apparatus for managing power of at least one facility as the controlling apparatus, and employs an apparatus for generating power management software by carrying out processing based upon the facility information and user determination information, and for transferring the power management software to corresponding controlling apparatus as the management apparatus.

A working apparatus employs an apparatus for calculating a difference between a working cost under a condition that a facility is worked without using facility working information and a working cost under a condition that a facility is worked using facility working information, and for laying a charge which is a predetermined percentage with respect to the calculated difference as the management apparatus.

A facility working system includes facilities and management apparatus, and which transfers facility information of each facility to the management apparatus from the facility, carries out processing in the management apparatus based upon the facility information, and transfers the facility working information based upon the processing to the facility from the management apparatus.

A facility working system includes a plurality of facilities and management apparatus, and which transfers facility information of each facility to the management apparatus from a part of the facilities, carries out processing in the management apparatus based upon the facility information of the part of the facilities, and transfers the facility working information based upon the processing to at least other part of facilities from the management apparatus.

A facility working system includes a plurality of facilities and management apparatus, and which transfers facility information of each facility to the management apparatus from two or more facilities, carries out processing in the management apparatus based upon the facility information of the two or more facilities, and transfers the facility working information based upon the processing to at least a part of facilities from the management apparatus.

A facility working system includes a plurality of facilities and management apparatus, and which transfers facility information of each facility to the management apparatus from the facility, the facility information of each facility being added discrimination information of every of each facility, carries out processing in the management apparatus based upon the facility information, and transfers the facility working information based upon the processing to the facility from the management apparatus.

A facility working system includes a plurality of facilities and management apparatus, and which transfers facility information of each facility to the management apparatus from the facility, the facility information of each facility being added discrimination information of every of each facility, carries out processing in the management apparatus based upon the facility information, and transfers the facility working information based upon the processing from the management apparatus to the facility which corresponds to the discrimination information.

A facility working system includes a plurality of facilities and management apparatus, and which transfers facility information of each facility to the management apparatus from the facility, the facility information of each facility being added discrimination information of every of each facility, carries out processing in the management apparatus based upon the facility information, and transfers the facility working information based upon the processing from the management apparatus to the facility which is added discrimination information other than the discrimination information.

A facility working system employs a facility comprising controlling apparatus for controlling the facility itself, as the facility.

A facility working system employs an air conditioner, as the facility.

A facility working system according employs a heat storage air conditioner or power storage air conditioner, as the facility, and employs information relevant to load of air conditioner, as the facility working information.

A facility working system employs a facility comprising controlling apparatus for controlling the facility itself and a memory device for storing received facility working information and being controlled by the controlling apparatus based upon the facility working information stored in the memory device, as the facility.

A facility working system employs a facility comprising a memory device and controlling apparatus and being driven and controlled by the controlling apparatus based upon the memory of the memory device, as the facility, and employs a memory device for storing facility working information by carrying out rewriting based upon the received facility working information, as the memory device.

A facility working system employs a facility working controlling software as the facility working information, and employs a facility which carries out self driving and controlling by the controlling apparatus based upon the facility working controlling software, as the facility.

A facility working system employs information transferred to the management apparatus via the controlling apparatus for driving and controlling the facility, as the facility information.

A facility working system employs information transferred to the controlling apparatus for driving and controlling the facility, as the facility information.

A facility working system employs an apparatus for carrying out processing based upon the facility information and exterior information given from the exterior, and for transferring facility working information based upon the processing to the facility, as the management apparatus.

A facility working system employs an apparatus for selecting facility working information among a plurality of facility working information stored in the management apparatus, as the management apparatus.

A facility working system lays a charge corresponding to a difference between a working cost under a condition that a facility is worked without using facility working information and a working cost under a condition that a facility is worked using facility working information.

A facility working system employs information necessary for judgement of maintenance time of the facility, as the facility information, employs processing for judging a maintenance time from the facility information, as the processing, and employs information relative to a maintenance time of the facility, as the facility working information.

A facility working system employs information obtained by calculating integration driving time from facility driving information representative of driving condition of the facility, and transferred to the facility in response to a condition that the integration driving time reaches a determined time, as the information relative to a maintenance time.

A facility working system employs information obtained from facility driving information representative of driving condition of the facility and the standard data of individual kind of facility, as the information relative to a maintenance time.

A facility working system employs information obtained based upon a difference between an initial facility driving information representative of driving condition of the facility under an initial condition and a facility driving information representative of driving condition of the facility at each timing, as the information relative to a maintenance time.

A facility working system employs information representative of a filter cleaning time and obtained based upon a pressure difference between in front and in rear of a filter, as the information relative to a maintenance time.

A management apparatus receives facility information of a facility, carries out processing based upon the received facility information, and transfers the facility working information based upon the processing to the facility, for managing a facility.

A management apparatus receives facility information of a part of facilities, carries out processing based upon the received facility information of the part of facilities, and transfers the facility working information based upon the processing to other part of facilities, for managing a plurality of facilities.

A management apparatus receives facility information of a plurality of facilities, carries out processing based upon the received facility information of the plurality of facilities, and transfers common facility working information based upon the processing to at least a part of facilities, for managing a plurality of facilities.

A management apparatus receives facility information of a facility, the facility information being added discrimination information of every each facility, carries out processing based upon the received facility information, and transfers the facility information based upon the processing to a facility, for managing a plurality of facilities.

A management apparatus receives facility information of a facility, the facility information being added discrimination information of every each facility, carries out processing based upon the received facility information, and transfers the facility information based upon the processing to facilities corresponding to the discrimination information, for managing a plurality of facilities.

A management apparatus receives facility information of a facility, the facility information being added discrimination information of every each facility, carries out processing based upon the received facility information, and transfers the facility information based upon the processing to facilities each added a discrimination information other than the discrimination information, for managing a plurality of facilities.

A management apparatus employs an air conditioner as the facility managed by the management apparatus.

A management apparatus employs facility information of a heat storage air conditioner or a power storage air conditioner as the facility, as the facility information received by the management apparatus, and employs information relative to an air conditioning load as the facility working information.

A management apparatus employs facility working and controlling software as the facility working information.

A management apparatus receives facility information and exterior information given from the exterior, carries out processing based upon the received facility information and exterior information, and transfers the facility working information based upon the processing to a facility.

A management apparatus employs processing for selecting any facility working information among the plurality of stored facility working information, as the processing.

A management apparatus comprising a calculation means for calculating a difference between a working cost under a condition that a facility is worked without using facility working information and a working cost under a condition that a facility is worked using facility working information.

A management apparatus employs information necessary for judging a maintenance time of a facility, as the facility information, employs processing for judging a maintenance time from the facility information, as the processing, and employs information relative to the maintenance time for the facility, as the facility working information.

A management apparatus employs information transferred to a facility in response to that an integration driving time reaches a determined time which integration driving time is calculated from facility driving information representative of driving condition of the facility, as the information relative to a maintenance time.

A management apparatus employs information obtained from the facility driving information representative of driving condition of the facility and the standard data for individual kind of facility, as the information relative to a maintenance time.

A management apparatus employs information obtained based upon a difference between an initial facility driving information representative of driving condition of the facility under an initial condition and a facility driving information representative of driving condition of the facility at each timing, as the information relative to a maintenance time.

A management apparatus employs information representative of a filter cleaning time and obtained based upon a pressure difference between in front and in rear of a filter, as the information relative to a maintenance time.

A facility transfers facility information to a management apparatus, and receives facility working information from the management apparatus obtained by carrying out processing based upon the facility information.

A facility transfers facility information to a management apparatus, the facility information being added self discrimination information, and receives facility working information from the management apparatus obtained by carrying out processing based upon the facility information.

A facility comprising a controlling apparatus for controlling the facility itself.

A facility includes an air conditioner.

A facility includes a heat storage air conditioner or power storage air conditioner, and employs information relative to an air conditioning load, as the facility working information.

A facility comprises a controlling apparatus for controlling the facility itself and a memory device for storing received facility working information, and is controlled by the controlling apparatus based upon the facility working information stored in the memory device.

A facility comprises a memory device and controlling apparatus, and is driven and controlled by the controlling apparatus based upon the memory of the memory device, and employs a memory device for storing facility working information by carrying out rewriting based upon the received facility working information, as the memory device.

A facility employs a facility working controlling software as the facility working information, and carries out self driving and controlling based upon the facility working controlling software.

A facility comprises a controlling apparatus for controlling the facility itself, and employs information transferred from the controlling apparatus to the management apparatus, as the facility information.

A facility comprises a controlling apparatus for controlling the facility itself, and employs information received by the controlling apparatus, as the facility information.

A facility comprises a calculation means for calculating a difference between a working cost under a condition that a facility is worked without using facility working information and a working cost under a condition that a facility is worked using facility working information.

A facility employs information necessary for judging a maintenance time of a facility, as the facility information, employs information relative to the maintenance time for the facility obtained by judging a maintenance time from the facility information, as the facility working information.

A facility employs information generated in response to that an integration driving time reaches a determined time which integration driving time is calculated from facility driving information representative of driving condition of the facility, as the information relative to a maintenance time.

A facility employs information obtained from the facility driving information representative of driving condition of the facility and the standard data for individual kind of facility, as the information relative to a maintenance time.

A facility employs information obtained based upon a difference between an initial facility driving information representative of driving condition of the facility under an initial condition and a facility driving information representative of driving condition of the facility at each timing, as the information relative to a maintenance time.

A facility employs information representative of a filter cleaning time and obtained based upon a pressure difference between in front and in rear of a filter, as the information relative to a maintenance time.

A facility comprises a step for transferring facility information from a facility to a management apparatus, a step for carrying out processing in the management apparatus based upon the facility information, and a step for transferring the facility working information from the management apparatus to the facility.

A facility comprises a step for transferring facility information to a management apparatus from a part of facilities among a plurality of facilities, a step for carrying out processing in the management apparatus based upon the facility information of the part of facilities, and a step for transferring the facility working information from the management apparatus to other part of facilities.

A facility comprises a step for transferring facility information to a management apparatus from two or more facilities among a plurality of facilities, a step for carrying out processing in the management apparatus based upon the facility information of the two or more facilities, and a step for transferring the facility working information from the management apparatus to at least a part of facilities.

A management method for managing a facility using a management apparatus, which method comprises a step for receiving facility information of a facility, a step for carrying out processing based upon the received facility information, and a step for transferring facility working information based upon the processing to the facility.

A management method for managing a plurality of facilities using a management apparatus, which method comprises a step for receiving facility information of a part of facilities, a step for carrying out processing based upon the received facility information of the part of facilities, and a step for transferring facility working information based upon the processing to at least other part of facilities.

A management method for managing a plurality of facilities using a management apparatus, which method comprises a step for receiving facility information of a plurality of facilities, a step for carrying out processing based upon the received facility information of the plurality of facilities, and a step for transferring common facility working information based upon the processing to at least a part of facilities.

A facility working method for working a facility which is managed using a management apparatus, which method comprises a step for transferring facility information to the management apparatus, and a step for receiving facility working information from the management apparatus, the facility working information being obtained by carrying out processing based upon the facility information.

A facility working system includes a facility comprising a memory device and a controlling apparatus, and a management apparatus for managing the facility, and which employs an apparatus for transferring facility working information from the management apparatus to the facility, as the management apparatus, and employs a facility driven and controlled using the controlling apparatus based upon facility working information stored in the memory device, as the facility, the facility working information being received from the management apparatus and being stored in the memory device.

A facility working system employs a memory device for storing facility working information by carrying out rewriting based upon received facility working information, as the memory device.

A facility working system employs software for facility working and controlling, as the facility working information.

A facility working system employs an air conditioner as the facility.

A management apparatus manages a facility comprising a memory device for storing facility information received from a management apparatus and a controlling apparatus for driving and controlling based upon the facility working information stored in the memory device, and which transfers facility working information to the facility.

A management apparatus employs a memory device for storing facility working information by carrying out rewriting based upon received facility working information, as the memory device.

A management apparatus employs software for facility working and controlling, as the facility working information.

A management apparatus employs an air conditioner as the facility.

A facility is managed using a management apparatus, and which comprises a memory device for storing facility working information received from the management apparatus and a controlling apparatus for driving and controlling based upon the facility working information stored in the memory device.

A facility employs a memory device for storing facility working information by carrying out rewriting based upon received facility working information, as the memory device.

A facility employs software for facility working and controlling, as the facility working information.

A facility includes an air conditioner.

A facility working method includes a facility comprising a memory device and a controlling apparatus, and a management apparatus for managing the facility, and which comprises a step for transferring facility working information to the facility from the management apparatus, a step for storing facility working information in the memory device in the facility, the facility working information being received from the management apparatus, and a step for driving and controlling using the controlling apparatus based upon facility working information stored in the memory device.

A management method comprises a step for transferring facility working information when a facility is managed, the facility comprising a memory device for storing facility working information received from a management apparatus, and a controlling apparatus for carrying out driving and controlling based upon the facility working information stored in the memory device.

A facility working method comprises a step for storing facility working information received from a management apparatus, and a step for carrying out driving and controlling based upon the facility working information stored in a memory device.

When the working method for facility is employed, the method includes a plurality of facilities and a management center, and the method extracts information of each facility, transfers the extracted facility information to the management center via a network, generates facility working information by carrying out processing based upon the facility information and external information given from exterior in the management center and transfers the facility working information to corresponding facility via the network. Therefore, performance required for each facility can be suppressed to be low performance, and sufficient working accuracy of each facility can be maintained by processing the processing content in the management center, the processing content being not able to be processed in each facility.

When the working method for facility is employed, the method includes a plurality of facilities and a management center, and the method controls each facility using corresponding controlling apparatus, extracts information of each facility using the controlling apparatus, transfers the facility information extracted by the controlling apparatus to the management center via a network, the facility information being added discrimination information, generates facility working information by carrying out processing based upon the facility information and external information given from exterior in the management center and transfers the facility working information to corresponding facility via the network. Therefore, performance required for each facility can be suppressed to be low performance, and sufficient working accuracy of each facility can be maintained by processing the processing content in the management center, the processing content being not able to be processed in each facility.

When the working method for facility is employed, the method generates facility working information by carrying out processing based upon the facility information and external information given from exterior in the management apparatus. Therefore, more accurate facility working information can be generated.

When the working method for facility is employed, the method employs a heat storage air conditioner or power storage air conditioner, as the facility, and the method generates estimation values of air conditioning load by carrying out processing based upon the facility information and external information given from exterior in the management apparatus. Therefore, the heat storage air conditioner or power storage air conditioner can be controlled most suitably.

When the working method for facility is employed, the method works a plurality of facilities using the controlling apparatus, and transfers necessary facility working controlling software to corresponding controlling apparatus via the network by carrying out processing based upon the facility information in the management apparatus. Therefore, only necessary and sufficient facility working controlling software can be incorporated in the controlling apparatus, and restriction of facility which can be worked and controlled, can be removed by the controlling apparatus.

When the working method for facility is employed, the method manages power of at least one facility using the controlling apparatus, generates power management software by carrying out processing based upon the facility information and user determination information in the management apparatus, and transfers the power management software to corresponding controlling apparatus. Therefore, only necessary and sufficient facility working controlling software can be incorporated in the controlling apparatus, and restriction of facility which can be worked and controlled, can be removed by the controlling apparatus.

When the working method for facility is employed, the method calculates a difference between a working cost under a condition that a facility is worked without using facility working information and a working cost under a condition that a facility is worked using facility working information, and lays a charge which is a predetermined percentage with respect to the calculated difference. Therefore, a charge amount can be laid which corresponds the decreased amount in working cost.

When the working apparatus for facility is employed, the apparatus includes a plurality of facilities and a management center, and a network which transfers facility information to the management center and transfers facility working information to corresponding facility from the management center, and which employs an apparatus for generating facility working information by carrying out processing based upon the facility information and external information given from exterior as the management center. Therefore, performance required for each facility can be suppressed to be low performance, and sufficient working accuracy of each facility can be maintained by processing the processing content in the management center, the processing content being not able to be processed in each facility.

When the working apparatus for facility is employed, the apparatus includes a plurality of facilities and a management center, and a controlling apparatus for controlling each facility and extracting information of each facility, and a network for transferring the facility information extracted by the controlling apparatus to the management center via a network, the facility information being added discrimination information, and for transferring the facility working information to corresponding facility from the management center, and which employs an apparatus for generating facility working information by carrying out processing based upon the facility information and external information given from exterior as the management center. Therefore, performance required for each facility can be suppressed to be low performance, and sufficient working accuracy of each facility can be maintained by processing the processing content in the management center, the processing content being not able to be processed in each facility.

When the working apparatus for facility is employed, the apparatus employs an apparatus for generating facility working information by carrying out processing based upon the facility information and external information given from exterior as the management apparatus. Therefore, more accurate facility working information can be generated.

When the working apparatus for facility is employed, the apparatus employs a heat storage air conditioner or power storage air conditioner as the facility, and the apparatus employs an apparatus for generating estimation values of air conditioning load by carrying out processing based upon the facility information and external information given from exterior as the management apparatus. Therefore, the heat storage air conditioner or power storage air conditioner can be controlled most suitably.

When the working apparatus for facility is employed, the apparatus employs an apparatus for working and controlling a plurality of facilities as the controlling apparatus, and the apparatus employs an apparatus for transferring necessary facility working controlling software to corresponding controlling apparatus via the network by carrying out processing based upon the facility information as the management apparatus. Therefore, only necessary and sufficient facility working controlling software can be incorporated in the controlling apparatus, and restriction of facility which can be worked and controlled, can be removed by the controlling apparatus.

When the working apparatus for facility is employed, the apparatus employs an apparatus for managing power of at least one facility as the controlling apparatus, and the apparatus employs an apparatus for generating power management software by carrying out processing based upon the facility information and user determination information, and for transferring the power management software to corresponding controlling apparatus as the management apparatus. Therefore, only necessary and sufficient facility working controlling software can be incorporated in the controlling apparatus, and restriction of facility which can be worked and controlled, can be removed by the controlling apparatus.

When the working apparatus for facility is employed, the apparatus employs an apparatus for calculating a difference between a working cost under a condition that a facility is worked without using facility working information and a working cost under a condition that a facility is worked using facility working information, and for laying a charge which is a predetermined percentage with respect to the calculated difference as the management apparatus. Therefore, a charge amount can be laid which corresponds the decreased amount in working cost.

When the facility working system is employed, the system includes facilities and management apparatus, and the system transfers facility information of each facility to the management apparatus from the facility, carries out processing in the management apparatus based upon the facility information, and transfers the facility working information based upon the processing to the facility from the management apparatus. Therefore, performance required for each facility can be suppressed to be low performance, and sufficient working accuracy of each facility can be maintained by processing the processing content in the management center, the processing content being not able to be processed in each facility.

When the facility working system is employed, the system includes a plurality of facilities and management apparatus, and the system transfers facility information of each facility to the management apparatus from a part of the facilities, carries out processing in the management apparatus based upon the facility information of the part of the facilities, and transfers the facility working information based upon the processing to at least other part of facilities from the management apparatus. Therefore, facility working information with high function or high quality can be obtained by carrying out processing based upon facility information of a facility with high function, when facilities with high function and facilities with low function exist, and working with high function or high quality can be performed based upon the facility working information with high function or high quality for facilities with low function.

When the facility working system is employed, the system includes a plurality of facilities and management apparatus, and the system transfers facility information of each facility to the management apparatus from two or more facilities, carries out processing in the management apparatus based upon the facility information of the two or more facilities, and transfers the facility working information based upon the processing to at least a part of facilities from the management apparatus. Therefore, an average facility working can be carried out even when a part of facilities transfer unique facility information.

When the facility working system is employed, the system includes a plurality of facilities and management apparatus, and the system transfers facility information of each facility to the management apparatus from the facility, the facility information of each facility being added discrimination information of every of each facility, carries out processing in the management apparatus based upon the facility information, and transfers the facility working information based upon the processing to the facility from the management apparatus. Therefore, performance required for each facility can be suppressed to be low performance, and sufficient working accuracy of each facility can be maintained by processing the processing content in the management center, the processing content being not able to be processed in each facility, and each facility can be discriminated.

When the facility working system is employed, the system includes a plurality of facilities and management apparatus, and the system transfers facility information of each facility to the management apparatus from the facility, the facility information of each facility being added discrimination information of every of each facility, carries out processing in the management apparatus based upon the facility information, and transfers the facility working information based upon the processing from the management apparatus to the facility which corresponds to the discrimination information. Therefore, performance required for each facility can be suppressed to be low performance, and sufficient working accuracy of each facility can be maintained by processing the processing content in the management center, the processing content being not able to be processed in each facility.

When the facility working system is employed, the system includes a plurality of facilities and management apparatus, and the system transfers facility information of each facility to the management apparatus from the facility, the facility information of each facility being added discrimination information of every of each facility, carries out processing in the management apparatus based upon the facility information, and transfers the facility working information based upon the processing from the management apparatus to the facility which is added discrimination information other than the discrimination information. Therefore, performance required for each facility can be suppressed to be low performance, and sufficient working accuracy of other facilities can be maintained by processing the processing content in the management center, the processing content being not able to be processed in each facility.

When the facility working system is employed, the system employs a facility comprising controlling apparatus for controlling the facility itself, as the facility. Therefore, driving and controlling based upon the facility working information can be carried out.

When the facility working system is employed, the system employs an air conditioner, as the facility.

When the facility working system is employed, the system employs a heat storage air conditioner or power storage air conditioner, as the facility, and employs information relevant to load of air conditioner, as the facility working information. Therefore, the heat storage air conditioner or power storage air conditioner can be driven and controlled using the facility working information.

When the facility working system is employed, the system employs a facility comprising controlling apparatus for controlling the facility itself and a memory device for storing received facility working information and being controlled by the controlling apparatus based upon the facility working information stored in the memory device, as the facility. Therefore, the facility can be driven and controlled by storing the facility working information in the memory device, and transfer frequency of the facility working information can be decreased.

When the facility working system is employed, the system employs a facility comprising a memory device and controlling apparatus and being driven and controlled by the controlling apparatus based upon the memory of the memory device, as the facility, and employs a memory device for storing facility working information by carrying out rewriting based upon the received facility working information, as the memory device. Therefore, the facility can be driven and controlled by storing the most recent facility working information in the memory device, and transfer frequency of the facility working information can be decreased.

When the facility working system is employed, the system employs a facility working controlling software as the facility working information, and employs a facility which carries out self driving and controlling by the controlling apparatus based upon the facility working controlling software, as the facility. Therefore, the facility can be driven and controlled by the controlling apparatus by transferring the facility working controlling software to the facility from the management apparatus, and consequently a capacity required for the controlling apparatus can be decreased, and version-up can easily be dealt with.

When the facility working system is employed, the system employs information transferred to the management apparatus via the controlling apparatus for driving and controlling the facility, as the facility information.

When the facility working system is employed, the system employs information transferred to the controlling apparatus for driving and controlling the facility, as the facility information.

When the facility working system is employed, the system employs an apparatus for carrying out processing based upon the facility information and exterior information given from the exterior, and for transferring facility working information based upon the processing to the facility, as the management apparatus. Therefore, the facility can be worked and controlled with high accuracy by obtaining the facility working information with high accuracy.

When the facility working system is employed, the system employs an apparatus for selecting facility working information among a plurality of facility working information stored in the management apparatus, as the management apparatus. Therefore, the processing in the management apparatus can be simplified When the facility working system is employed, the system lays a charge corresponding to a difference between a working cost under a condition that a facility is worked without using facility working information and a working cost under a condition that a facility is worked using facility working information. Therefore, laying a charge corresponding to actual working cost merit can be carried out.

When the facility working system is employed, the system employs information necessary for judgement of maintenance time of the facility, as the facility information, employs processing for judging a maintenance time from the facility information, as the processing, and employs information relative to a maintenance time of the facility, as the facility working information. Therefore, maintenance of the facility can be carried out precisely.

When the facility working system is employed, the system employs information obtained by calculating integration driving time from facility driving information representative of driving condition of the facility, and transferred to the facility in response to a condition that the integration driving time reaches a determined time, as the information relative to a maintenance time. Therefore, maintenance of the facility can be carried out precisely based upon the integration driving time.

When the facility working system is employed, the system employs information obtained from facility driving information representative of driving condition of the facility and the standard data of individual kind of facility, as the information relative to a maintenance time. Therefore, maintenance of the facility can be carried out precisely responding to the kinds of facility.

When the facility working system is employed, the system employs information obtained based upon a difference between an initial facility driving information representative of driving condition of the facility under an initial condition and a facility driving information representative of driving condition of the facility at each timing, as the information relative to a maintenance time. Therefore, maintenance of the facility can be carried out precisely based upon the variation in facility driving information.

When the facility working system is employed, the system employs information representative of a filter cleaning time and obtained based upon a pressure difference between in front and in rear of a filter, as the information relative to a maintenance time. Therefore, cleaning of the filter can be carried out precisely.

When the management apparatus is employed, the apparatus receives facility information of a facility, carries out processing based upon the received facility information, and transfers the facility working information based upon the processing to the facility, for managing a facility. Therefore, sufficient working accuracy of each facility can be maintained by processing the processing content in the management center, the processing content being not able to be processed in each facility.

When the management apparatus is employed, the apparatus receives facility information of a part of facilities, carries out processing based upon the received facility information of the part of facilities, and transfers the facility working information based upon the processing to other part of facilities, for managing a plurality of facilities. Therefore, facility working information with high function or high quality can be obtained by carrying out processing based upon facility information of a facility with high function, when facilities with high function and facilities with low function exist, and working with high function or high quality can be performed based upon the facility working information with high function or high quality for facilities with low function.

When the management apparatus is employed, the apparatus receives facility information of a plurality of facilities, carries out processing based upon the received facility information of the plurality of facilities, and transfers common facility working information based upon the processing to at least a part of facilities, for managing a plurality of facilities. Therefore, an average facility working can be carried out even when a part of facilities transfer unique facility information.

When the management apparatus is employed, the apparatus receives facility information of a facility, the facility information being added discrimination information of every each facility, carries out processing based upon the received facility information, and transfers the facility information based upon the processing to a facility, for managing a plurality of facilities. Therefore, performance required for each facility can be suppressed to be low performance, and sufficient working accuracy of each facility can be maintained by processing the processing content in the management center, the processing content being not able to be processed in each facility, and each facility can be discriminated.

When the management apparatus is employed, the apparatus receives facility information of a facility, the facility information being added discrimination information of every each facility, carries out processing based upon the received facility information, and transfers the facility information based upon the processing to facilities corresponding to the discrimination information, for managing a plurality of facilities. Therefore, performance required for each facility can be suppressed to be low performance, and sufficient working accuracy of each facility can be maintained by processing the processing content in the management center, the processing content being not able to be processed in each facility.

When the management apparatus is employed, the apparatus receives facility information of a facility, the facility information being added discrimination information of every each facility, carries out processing based upon the received facility information, and transfers the facility information based upon the processing to facilities each added a discrimination information other than the discrimination information, for managing a plurality of facilities. Therefore, sufficient working accuracy of other facilities can be maintained by processing the processing content in the management center, the processing content being not able to be processed in each facility.

When the management apparatus is employed, the apparatus employs an air conditioner as the facility managed by the management apparatus.

When the management apparatus is employed, the apparatus employs facility information of a heat storage air conditioner or a power storage air conditioner as the facility, as the facility information received by the management apparatus, and employs information relative to an air conditioning load as the facility working information. Therefore, the heat storage air conditioner or power storage air conditioner can be driven and controlled using the facility working information.

When the management apparatus is employed, the apparatus employs facility working and controlling software as the facility working information. Therefore, the facility can be driven and controlled by the controlling apparatus by transferring the facility working controlling software to the facility from the management apparatus, and consequently version-up can easily be dealt with.

When the management apparatus is employed, the apparatus receives facility information and exterior information given from the exterior, carries out processing based upon the received facility information and exterior information, and transfers the facility working information based upon the processing to a facility. Therefore, the facility can be worked and controlled with high accuracy by obtaining the facility working information with high accuracy.

When the management apparatus is employed, the apparatus employs processing for selecting any facility working information among the plurality of stored facility working information, as the processing. Therefore, the processing in the management apparatus can be simplified.

When the management apparatus is employed, the apparatus further comprises a calculation means for calculating a difference between a working cost under a condition that a facility is worked without using facility working information and a working cost under a condition that a facility is worked using facility working information. Therefore, actual working cost merit can be calculated.

When the management apparatus is employed, the apparatus employs information necessary for judging a maintenance time of a facility, as the facility information, employs processing for judging a maintenance time from the facility information, as the processing, and employs information relative to the maintenance time for the facility, as the facility working information. Therefore, maintenance of the facility can be carried out precisely.

When the management apparatus is employed, the apparatus employs information transferred to a facility in response to that an integration driving time reaches a determined time which integration driving time is calculated from facility driving information representative of driving condition of the facility, as the information relative to a maintenance time. Therefore, maintenance of the facility can be carried out precisely using the integration driving time.

When the management apparatus is employed, the apparatus employs information obtained from the facility driving information representative of driving condition of the facility and the standard data for individual kind of facility, as the information relative to a maintenance time. Therefore, maintenance of the facility can be carried out precisely responding to the kinds of facility.

When the management apparatus is employed, the apparatus employs information obtained based upon a difference between an initial facility driving information representative of driving condition of the facility under an initial condition and a facility driving information representative of driving condition of the facility at each timing, as the information relative to a maintenance time. Therefore, maintenance of the facility can be carried out precisely based upon the variation in facility driving information.

When the management apparatus is employed, the apparatus employs information representative of a filter cleaning time and obtained based upon a pressure difference between in front and in rear of a filter, as the information relative to a maintenance time. Therefore, cleaning of the filter can be carried out precisely.

When the facility is employed, the facility transfers facility information to a management apparatus, and receives facility working information from the management apparatus obtained by carrying out processing based upon the facility information. Therefore, sufficient working accuracy of the facility can be maintained by processing the processing content in the management center, the processing content being not able to be processed in the facility.

When the facility is employed, the facility transfers facility information to a management apparatus, the facility information being added self discrimination information, and receives facility working information from the management apparatus obtained by carrying out processing based upon the facility information. Therefore, sufficient working accuracy of each facility can be maintained by processing the processing content in the management center, the processing content being not able to be processed in each facility, and each facility can be discriminated by the management apparatus.

When the facility is employed, the facility further comprises a controlling apparatus for controlling the facility itself. Therefore, driving and controlling based upon the facility working information can be carried out.

When the facility is employed, the facility includes an air conditioner. Therefore, the operation and effect can be realized when the air conditioner is driven and controlled.

When the facility is employed, the facility includes a heat storage air conditioner or power storage air conditioner, and employs information relative to an air conditioning load, as the facility working information. Therefore, the heat storage air conditioner or power storage air conditioner can be driven and controlled using the facility working information.

When the facility is employed, the facility comprises a controlling apparatus for controlling the facility itself and a memory device for storing received facility working information, and is controlled by the controlling apparatus based upon the facility working information stored in the memory device. Therefore, receiving frequency of the facility working information can be decreased.

When the facility is employed, the facility comprises a memory device and controlling apparatus, and is driven and controlled by the controlling apparatus based upon the memory of the memory device, and employs a memory device for storing facility working information by carrying out rewriting based upon the received facility working information, as the memory device. Therefore, the facility can be driven and controlled based upon the most recent facility working information, and transfer frequency of the facility working information can be decreased.

When the facility is employed, the facility employs a facility working controlling software as the facility working information, and carries out self driving and controlling based upon the facility working controlling software. Therefore, the facility can be driven and controlled by the facility working controlling software, and consequently version-up can easily be dealt with.

When the facility is employed, the facility comprises a controlling apparatus for controlling the facility itself, and employs information transferred from the controlling apparatus to the management apparatus, as the facility information.

When the facility is employed, the facility comprises a controlling apparatus for controlling the facility itself, and employs information received by the controlling apparatus, as the facility information.

When the facility is employed, the facility further comprises a calculation means for calculating a difference between a working cost under a condition that a facility is worked without using facility working information and a working cost under a condition that a facility is worked using facility working information. Therefore, actual working cost merit can be calculated.

When the facility is employed, the facility employs information necessary for judging a maintenance time of a facility, as the facility information, employs information relative to the maintenance time for the facility obtained by judging a maintenance time from the facility information, as the facility working information. Therefore, maintenance can be carried out precisely.

When the facility is employed, the facility employs information generated in response to that an integration driving time reaches a determined time which integration driving time is calculated from facility driving information representative of driving condition of the facility, as the information relative to a maintenance time. Therefore, maintenance can be carried out precisely using the integration driving time.

When the facility is employed, the facility employs information obtained from the facility driving information representative of driving condition of the facility and the standard data for individual kind of facility, as the information relative to a maintenance time. Therefore, maintenance can be carried out precisely responding to the kinds of facility.

When the facility is employed, the facility employs information obtained based upon a difference between an initial facility driving information representative of driving condition of the facility under an initial condition and a facility driving information representative of driving condition of the facility at each timing, as the information relative to a maintenance time. Therefore, maintenance can be carried out precisely based upon the variation in facility driving information.

When the facility is employed, the facility employs information representative of a filter cleaning time and obtained based upon a pressure difference between in front and in rear of a filter, as the information relative to a maintenance time. Therefore, cleaning of the filter can be carried out precisely.

When the facility working method is employed, the method comprises a step for transferring facility information from a facility to a management apparatus, a step for carrying out processing in the management apparatus based upon the facility information, and a step for transferring the facility working information from the management apparatus to the facility. Therefore, performance required for each facility can be suppressed to be low performance, and sufficient working accuracy of each facility can be maintained by processing the processing content in the management center, the processing content being not able to be processed in each facility.

When the facility working method is employed, the method comprises a step for transferring facility information to a management apparatus from a part of facilities among a plurality of facilities, a step for carrying out processing in the management apparatus based upon the facility information of the part of facilities, and a step for transferring the facility working information from the management apparatus to other part of facilities. Therefore, facility working information with high function or high quality can be obtained by carrying out processing based upon facility information of a facility with high function, when facilities with high function and facilities with low function exist, and working with high function or high quality can be performed based upon the facility working information with high function or high quality for facilities with low function.

When the facility working method is employed, the method comprises a step for transferring facility information to a management apparatus from two or more facilities among a plurality of facilities, a step for carrying out processing in the management apparatus based upon the facility information of the two or more facilities, and a step for transferring the facility working information from the management apparatus to at least a part of facilities. Therefore, an average facility working can be carried out even when a part of facilities transfer unique facility information.

When the management method is employed, the method manages a facility using a management apparatus, and comprises a step for receiving facility information of a facility, a step for carrying out processing based upon the received facility information, and a step for transferring facility working information based upon the processing to the facility.

Therefore, performance required for each facility can be suppressed to be low performance, and sufficient working accuracy of each facility can be maintained by processing the processing content in the management center, the processing content being not able to be processed in each facility.

When the management method is employed, the method manages a plurality of facilities using a management apparatus, and comprises a step for receiving facility information of a part of facilities, a step for carrying out processing based upon the received facility information of the part of facilities, and a step for transferring facility working information based upon the processing to at least other part of facilities. Therefore, facility working information with high function or high quality can be obtained by carrying out processing based upon facility information of a facility with high function, when facilities with high function and facilities with low function exist, and working with high function or high quality can be performed based upon the facility working information with high function or high quality for facilities with low function.

When the management method is employed, the method manages a plurality of facilities using a management apparatus, and comprises a step for receiving facility information of a plurality of facilities, a step for carrying out processing based upon the received facility information of the plurality of facilities, and a step for transferring common facility working information based upon the processing to at least a part of facilities. Therefore, an average facility working can be carried out even when a part of facilities transfer unique facility information.

When the facility working method is employed, the method works a facility which is managed using a management apparatus, and comprises a step for transferring facility information to the management apparatus, and a step for receiving facility working information from the management apparatus, the facility working information being obtained by carrying out processing based upon the facility information. Therefore, performance required for each facility can be suppressed to be low performance, and sufficient working accuracy of each facility can be maintained by processing the processing content in the management center, the processing content being not able to be processed in each facility.

When the facility working system is employed, the system includes a facility comprising a memory device and a controlling apparatus, and a management apparatus for managing the facility, and employs an apparatus for transferring facility working information from the management apparatus to the facility, as the management apparatus, and employs a facility driven and controlled using the controlling apparatus based upon facility working information stored in the memory device, as the facility, the facility working information being received from the management apparatus and being stored in the memory device. Therefore, performance required for each facility can be suppressed to be low performance despite a condition that information transferring from the facility to the management apparatus is allowed or not, and sufficient working accuracy of each facility can be maintained by processing the processing content in the management center, the processing content being not able to be processed in each facility.

When the facility working system is employed, the system employs a memory device for storing facility working information by carrying out rewriting based upon received facility working information, as the memory device. Therefore, driving and controlling of the facility can be carried out by storing the most recent facility working information in the memory device, and transferring frequency of the facility working information can be decreased.

When the facility working system is employed, the system employs software for facility working and controlling, as the facility working information. Therefore, the facility can be driven and controlled by the controlling apparatus by transferring the facility working controlling software to the facility from the management apparatus, and consequently a capacity required for the controlling apparatus can be decreased, and version-up can easily be dealt with.

When the facility working system is employed, the system employs an air conditioner as the facility. Therefore, the operation and effect can be realized when the air conditioner is driven and controlled.

When the management apparatus is employed, the apparatus manages a facility comprising a memory device for storing facility information received from a management apparatus and a controlling apparatus for driving and controlling based upon the facility working information stored in the memory device, and the apparatus transfers facility working information to the facility. Therefore, performance required for each facility can be suppressed to be low performance despite a condition that information transferring from the facility to the management apparatus is allowed or not, and sufficient working accuracy of each facility can be maintained by processing the processing content in the management center, the processing content being not able to be processed in each facility.

When the management apparatus is employed, the apparatus employs a memory device for storing facility working information by carrying out rewriting based upon received facility working information, as the memory device. Therefore, driving and controlling of the facility can be carried out by storing the most recent facility working information in the memory device, and transferring frequency of the facility working information can be decreased.

When the management apparatus is employed, the apparatus employs software for facility working and controlling, as the facility working information. Therefore, the facility can be driven and controlled by the controlling apparatus by transferring the facility working controlling software to the facility from the management apparatus, and consequently a capacity required for the controlling apparatus can be decreased, and version-up can easily be dealt with.

When the management apparatus is employed, the apparatus employs an air conditioner as the facility. Therefore, the operation and effect can be realized when the air conditioner is driven and controlled.

When the facility is employed, the facility is managed using a management apparatus, and the facility comprises a memory device for storing facility working information received from the management apparatus and a controlling apparatus for driving and controlling based upon the facility working information stored in the memory device. Therefore, performance required for each facility can be suppressed to be low performance despite a condition that information transferring from the facility to the management apparatus is allowed or not, and sufficient working accuracy of each facility can be maintained by processing the processing content in the management center, the processing content being not able to be processed in each facility.

When the facility is employed, the facility employs a memory device for storing facility working information by carrying out rewriting based upon received facility working information, as the memory device. Therefore, driving and controlling of the facility can be carried out by storing the most recent facility working information in the memory device, and transferring frequency of the facility working information can be decreased.

When the facility is employed, the facility employs software for facility working and controlling, as the facility working information. Therefore, the facility can be driven and controlled by the controlling apparatus by transferring the facility working controlling software to the facility from the management apparatus, and consequently a capacity required for the controlling apparatus can be decreased, and version-up can easily be dealt with.

When the facility is employed, the facility includes an air conditioner. Therefore, the operation and effect can be realized when the air conditioner is driven and controlled.

When the facility working method is employed, the method includes a facility comprising a memory device and a controlling apparatus, and a management apparatus for managing the facility, and the method comprises a step for transferring facility working information to the facility from the management apparatus, a step for storing facility working information in the memory device in the facility, the facility working information being received from the management apparatus, and a step for driving and controlling using the controlling apparatus based upon facility working information stored in the memory device. Therefore, performance required for each facility can be suppressed to be low performance despite a condition that information transferring from the facility to the management apparatus is allowed or not, and sufficient working accuracy of each facility can be maintained by processing the processing content in the management center, the processing content being not able to be processed in each facility.

When the management method is employed, the method comprises a step for transferring facility working information when a facility is managed, the facility comprising a memory device for storing facility working information received from a management apparatus, and a controlling apparatus for carrying out driving and controlling based upon the facility working information stored in the memory device. Therefore, performance required for each facility can be suppressed to be low performance despite a condition that information transferring from the facility to the management apparatus is allowed or not, and sufficient working accuracy of each facility can be maintained by processing the processing content in the management center, the processing content being not able to be processed in each facility.

When the facility working method is employed, the method comprises a step for storing facility working information received from a management apparatus, and a step for carrying out driving and controlling based upon the facility working information stored in a memory device. Therefore, performance required for each facility can be suppressed to be low performance despite a condition that information transferring from the facility to the management apparatus is allowed or not, and sufficient working accuracy of each facility can be maintained by processing the processing content in the management center, the processing content being not able to be processed in each facility.

BEST MODE FOR CARRYING OUT THE INVENTION

Hereinafter, referring to the attached drawings, we explain a facility working method and apparatus of an embodiment according to the present invention.

Figure 1:
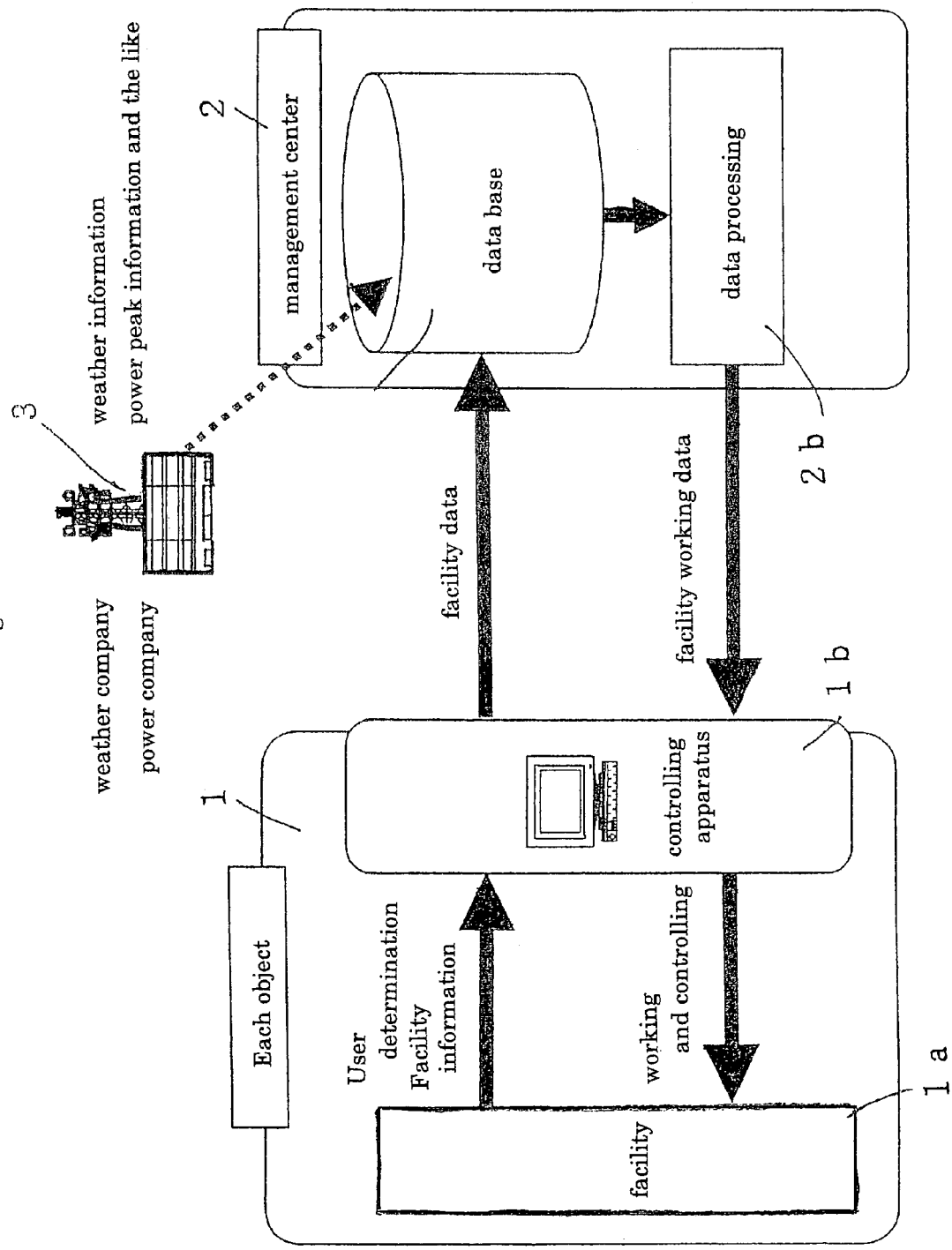
FIG. 1 is a schematic diagram illustrating a facility working apparatus of an embodiment according to the present invention.

FIG. 1 is a schematic diagram illustrating a facility working apparatus of an embodiment according to the present invention.

The facility working apparatus includes objects 1, a management center 2, and an exterior information source 3 such as a weather company, a power company or the like. Each object 1 and the management center 2, the exterior information source 3 and the management center 2 are connected via a network (public telephone network, internet or the like). Each object 1 includes a facility 1a such as a heat storage air conditioner, power storage air conditioner or the like, and a controlling apparatus 1b for working and controlling the facility 1a and for extracting facility information of the facility 1a (physical information of the facility and the like) and user determination information. The management center 2 includes a database 2a and a data processing section 2b.

The database 2a holds power rates for individual time zone, controlling constant for individual season and the like, holds constants required for working of each facility and the like, and temporarily holds exterior information, facility information and the like. The database 2a also holds facility working cost of each facility prior to introduction of the facility working apparatus of this embodiment.

The data processing section 2b carries out predetermined processing based upon facility information (room temperature, body temperature and the like) from the controlling section 1b, exterior information (weather information, power peak information and the like) from the exterior information source 3, and the data held in the database 2a, and generates facility working data required for facility working. The data processing section 2b also compares a facility working cost of each object prior to introduction of the facility working apparatus of this embodiment and a facility working cost of each object after the introduction of the facility working apparatus of this embodiment, calculates a cost-down amount due to the facility working cost of each object after the introduction of the facility working apparatus of this embodiment, calculates a charging amount based upon the calculated cost-down amount, and transfers the charging amount to corresponding controlling apparatus 1b via the network.

The controlling apparatus 1b has minimum performance required for working corresponding facility using the facility working data which is supplied from the data processing section 2b.

Operation of the facility working apparatus having the above arrangement is as follows.

In each object 1, facility information of established facility 1a is extracted by the controlling apparatus 1b, and user determination information determined by a user is also extracted by the controlling apparatus 1b. The extracted facility information and user determination information are transferred to the management center 2 via the network.

In the management center 2, receives the transferred facility information and user determination information, and the exterior information from the exterior information source 3, carries out predetermined processing using those information, generates facility working information, and transfers the facility working information to the controlling apparatus 1b via the network.

In the controlling apparatus 1b, working and controlling of the facility 1a are carried out using the transferred facility working data.

Therefore, corresponding facility 1a can be worked and controlled finely using the facility working data transferred from the data processing section 2b, without improving the performance of the controlling apparatus 1b (in other words, when the controlling apparatus 1b has performance which is insufficient for generation of the facility working data).

As a result, a cost of each object 1 can greatly be decreased, and easiness for introduction of each object 1 can be improved in comparison with a case that a controlling apparatus having sufficient performance for generation of facility working data is employed as the controlling apparatus included in each object.

When the facility working method and the like should be varied, it is sufficient that data prescribing varied facility working method is supplied to the controlling apparatus 1b via the network, and it is not required that a full-time administrator is assigned for every each object. Therefore, management of each object 1 can be simplified.

Further, it is possible that a charge corresponding to the cost merit is calculated, and that the charge is billed to each object 1, the cost merit being obtained by introducing the facility working apparatus of this embodiment.

Next, description is made for a case in which heat storage air conditioner system is employed as the facility 1a.

In the conventional heat storage air conditioner system, for example, air conditioning load for a next day is estimated using the air conditioning load of the day, and heat storage operation is carried out during a non-heat radiation time band, the operation being corresponding to the estimated air conditioning load. But, air conditioning load is greatly affected by weather (exterior temperature, sunshine, and the like) of the day, therefore, it is highly possible that the estimated air conditioning load is greatly different from actual air conditioning load. If the estimated air conditioning load is smaller than the actual air conditioning load, heat storage amount is short, and the power for the non-heat radiation time band is used for the shortage amount. Therefore, sufficient leveling for power demand cannot be realized, and power rates become increased.

When schedule-timer controlling is carried out, if actual air conditioning load is smaller than the estimated air conditioning load, some of the heat storage amount is left over. Therefore, heat radiation loss is generated so that heat storage energy becomes useless.

To dissolve such disadvantages, it is sufficient that air conditioning load for the next day is estimated by taking an exterior temperature, room temperature, temperature of a building body and the like into consideration. In this case, an extremely large amount of data should be collected and an estimation processing based upon those data should be carried out, therefore a controlling apparatus with extremely high performance should be employed as the controlling apparatus for controlling a heat storage air conditioner. As a result, an extreme increase in cost is realized for the entire heat storage air conditioner, therefore popularization of heat storage air conditioner is prevented.

On the contrary, when the embodiment according to the present invention is employed, processing requiring an extremely high processing ability such as the estimation processing for air conditioning load is carried out in the management center 2, estimation values for air conditioning load and the like are transferred to the controlling apparatus 1b of each heat storage air conditioner 1 via the network. And, in each heat storage air conditioner system 1, the controlling apparatus 1b controls the heat storage air conditioner using the estimated values for air conditioning load and the like. Therefore, sufficient leveling in power demand is realized, and decrease in power rates are also realized.

Figure 2:
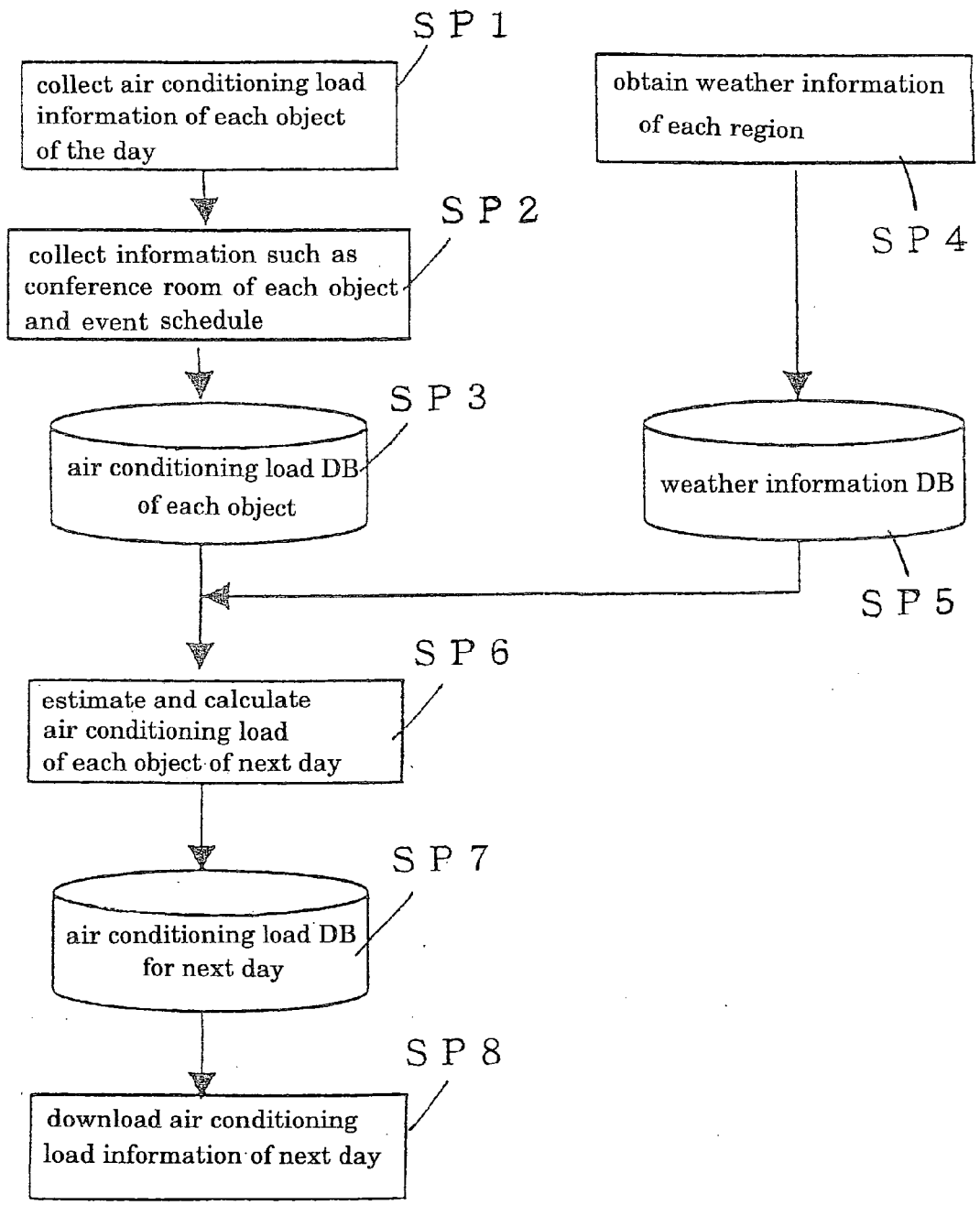
FIG. 2 is a processing flow diagram useful in understanding processing of a management center.

Referring to the processing flow diagram in FIG. 2, the processing in the management center 2 for this case is described.

In step SP1, air conditioning load information of the day of each property is collected. In step SP2, information is collected such as usage schedule of conference rooms of each property, event schedule of the day, and the like. In step SP3, air conditioning load information of each property is extracted from the air conditioning load data base of each property.

In step SP4, weather information of each region is obtained and is held as weather information data base. In step SP5, weather information of a region corresponding to each property is extracted from the weather information data base.

In step SP6, estimation values of air conditioning load of the next day of each property is calculated based upon the extracted air conditioning load information and weather information, and the estimation values are held in the air conditioning load data base for the next day. In step SP7, the estimation values of air conditioning load of the next day of each property is transferred to corresponding property via the network.

In this embodiment, past power rates (for example, power rates for every season, prior to introduction of this embodiment) of each heat storage air conditioner system 1 are held in the data base 2a of the management center 2, therefore cost merit can be calculated by calculating the power rates after the introduction of this embodiment and by obtaining the difference between the power rates. A charge corresponding to the calculated cost merit is charged to each heat storage air conditioner system via the network, therefore only charge within the cost merit of each heat storage air conditioner system can be collected. However, the calculation section for charges is not illustrated in the processing flow diagram of FIG. 2.

Further, in this embodiment, by supplying information representing working condition of air conditioners to the data processing section 2b of the management center 2 from each controlling apparatus 1b, the management center 2 monitors the working condition of air conditioners, judges whether or not the ability of the air conditioner is excessive with respect to the air conditioning load based upon the monitoring of the working condition. And, in response to the judgement representing the ability of the air conditioner being excessive, the management center 2 transfers data or working and controlling software to corresponding controlling apparatus 1b from the data processing section 2b via the network so that saving in energy and saving in power can be realized, the data or working and controlling software carrying out working and controlling of the air conditioner so as to change heat exchanging temperature (raising in summer, and lowering in winter) of an interior unit of the air conditioner.

Figure 3:
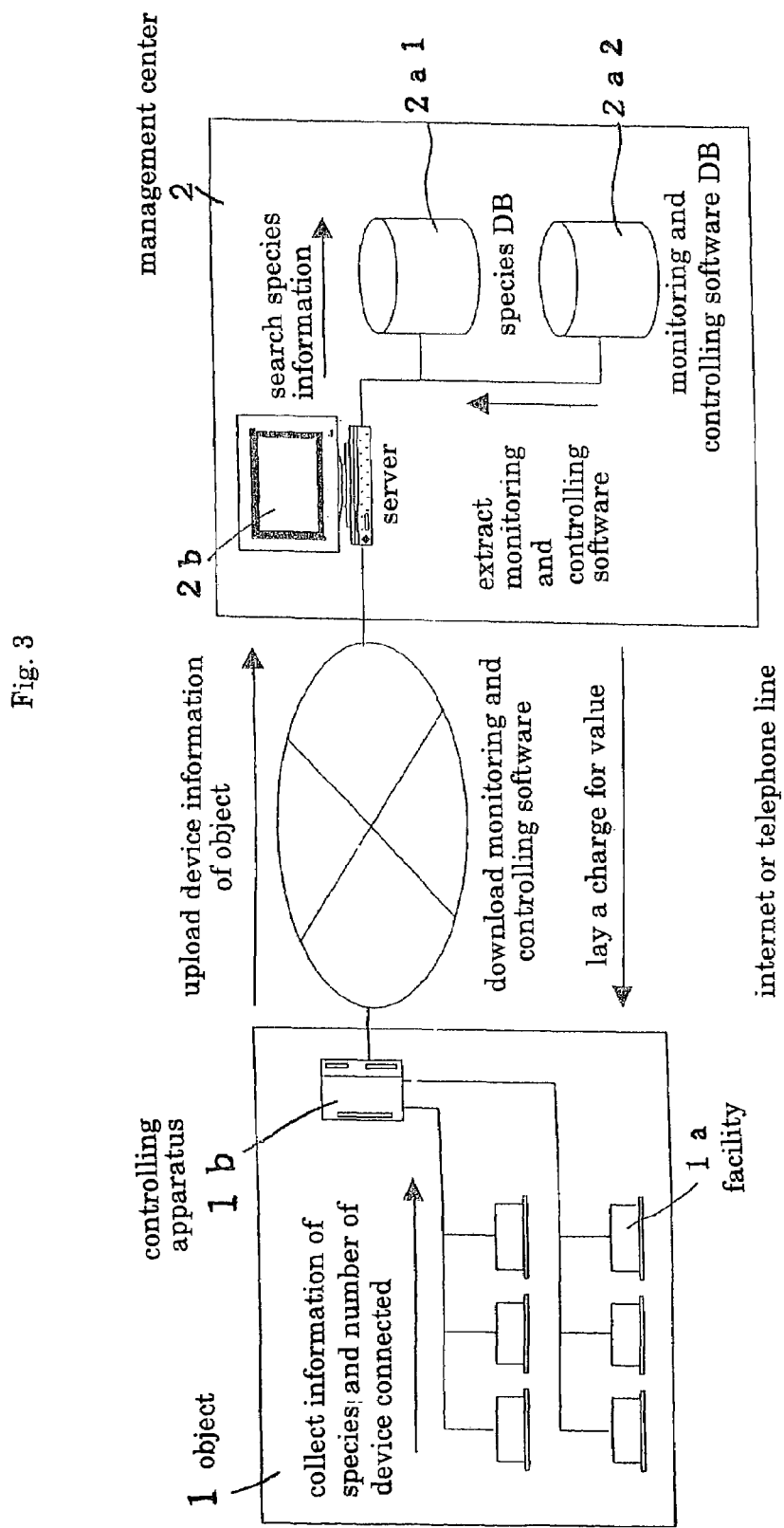
FIG. 3 is a block diagram schematically illustrating an arrangement of a facility working apparatus corresponding to a case in which a building is employed as an object.

FIG. 3 is a block diagram schematically illustrating an arrangement of facility working apparatus corresponding to a case in which a building is employed as the property.

This facility working apparatus works and controls a plurality of facilities 1a disposed in each object 1 using the controlling apparatus 1b, carries out predetermined processing by accessing machine type data base 2a1, working and controlling data base 2a2, and exterior information data base (not illustrated) provided in the management center 2, using the server 2b, and transfers the processed result data to each controlling apparatus 1bvia the network. In the controlling apparatus 1b, information relative to a plurality of facilities 1a disposed in each object 1 (for example, information concerning machine type of each facility, and the like) is extracted and is transferred to the server 2b via the network. The server 2b receives exterior information from exterior information source (not illustrated) via the network, carries out predetermined processing by taking the exterior information into consideration, and transfers the processed result data to each controlling apparatus 1b via the network, and/or reads the working and controlling software from the working and controlling data base 2a2 and transfers the working and controlling software to each controlling apparatus 1b.

Operation and effect are as follows in a case that the facility working apparatus having the above arrangement is employed.

In each building, various facilities 1a such as heat storage air conditioners and the like are disposed. Species and number of disposed facilities 1a are different depending upon the building.

But, in this embodiment, species and number of facilities 1a disposed in each building are extracted by each controlling apparatus 1b, and are transferred to the server 2b via the network, and information concerning the property is extracted by each controlling apparatus 1b, and is transferred to the server 2b via the network. Therefore, the present condition can be extracted accurately by each controlling apparatus 1b, even when the facility 1a is added or modified.

In the server 2b, species of facilities 1a and the like for each building are held in the machine type data base 2a1, working and controlling software for working and controlling each facility 1a based upon the held contents of the machine type data base 2a1 is read from the working and controlling data base 2a2, and the working and controlling software is transferred to corresponding controlling apparatus 1b. When version-up and the like of the working and controlling software is realized, this information is received and is held in the working and controlling data base 2a2. Depending upon the species of the facility a, in the server 2b, processing based upon exterior information and the like, is carried out so that data required for working and controlling are calculated, and the data is transferred to corresponding controlling apparatus 1b.

Therefore, at the initial stage of the establishment of each controlling apparatus 1b, it is sufficient that only software for carrying out minimum required processing such as information extraction, extracted data transferring and the like, are installed in the controlling apparatus 1b. Then, each controlling apparatus 1b transfers the extraction data to the server 2n via the network. Therefore, the working and controlling software judged to be necessary based upon the extraction data, is read from the working and controlling data base 2a2 and is transferred to corresponding controlling apparatus 1b, so that a condition is realized that the working and controlling of each facility 1a by the controlling apparatus 1b can be carried out.

Thereafter, the working and controlling of each facility 1a can be carried out by executing the working and controlling software by each controlling apparatus 1b. Further, depending upon species of the facility 1a, the server 2b carries out predetermined processing based upon the exterior information, calculates data required for controlling, and transfers the data to each controlling apparatus 1b. Therefore, in each controlling apparatus 1b, working and controlling of each facility 1a can be carried out by executing the working and controlling software using the data received from the server 2b.

When the facility working apparatus having the arrangement of FIG. 3 is employed, the working and controlling software is not installed in each controlling apparatus 1b at its initial stage, but only the working and controlling software, which is necessary depending upon the species if the disposed facility 1a, is downloaded from the server 2b. Therefore, disadvantage is prevented from occurrence such that useless working and controlling software is installed in each controlling apparatus 1b. Also, disadvantage is prevented from occurrence such that facilities 1a, which can be disposed in the object 1, are restricted when the working and controlling software is previously installed in the controlling apparatus 1b.

In the facility working apparatus having the arrangement which is illustrated in FIG. 3, species of the working and controlling software, which is downloaded in each controlling apparatus 1b, is known by the server 2b, and a working time of the working and controlling software is known by the server 2b. Therefore, charging can be carried out based upon the species and the working time of the working and controlling software. Of course, when calculation of data, which is required for working and controlling, is carried out in the server 2b, charging corresponding to this processing can be carried out.

Further, in the foregoing, description was made for a case in which required working and controlling software corresponding to the species of the disposed facility 1a is automatically downloaded. But, it is preferable that the working and controlling software to be downloaded can be selected based upon the desire of a user, when a plurality of species of working and controlling software are held in the working and controlling data base 2a2 in correspondence to each facility 1a. In this case, it is preferable that the working and controlling software can be selected on a display of each controlling apparatus 1b.

Figure 4:
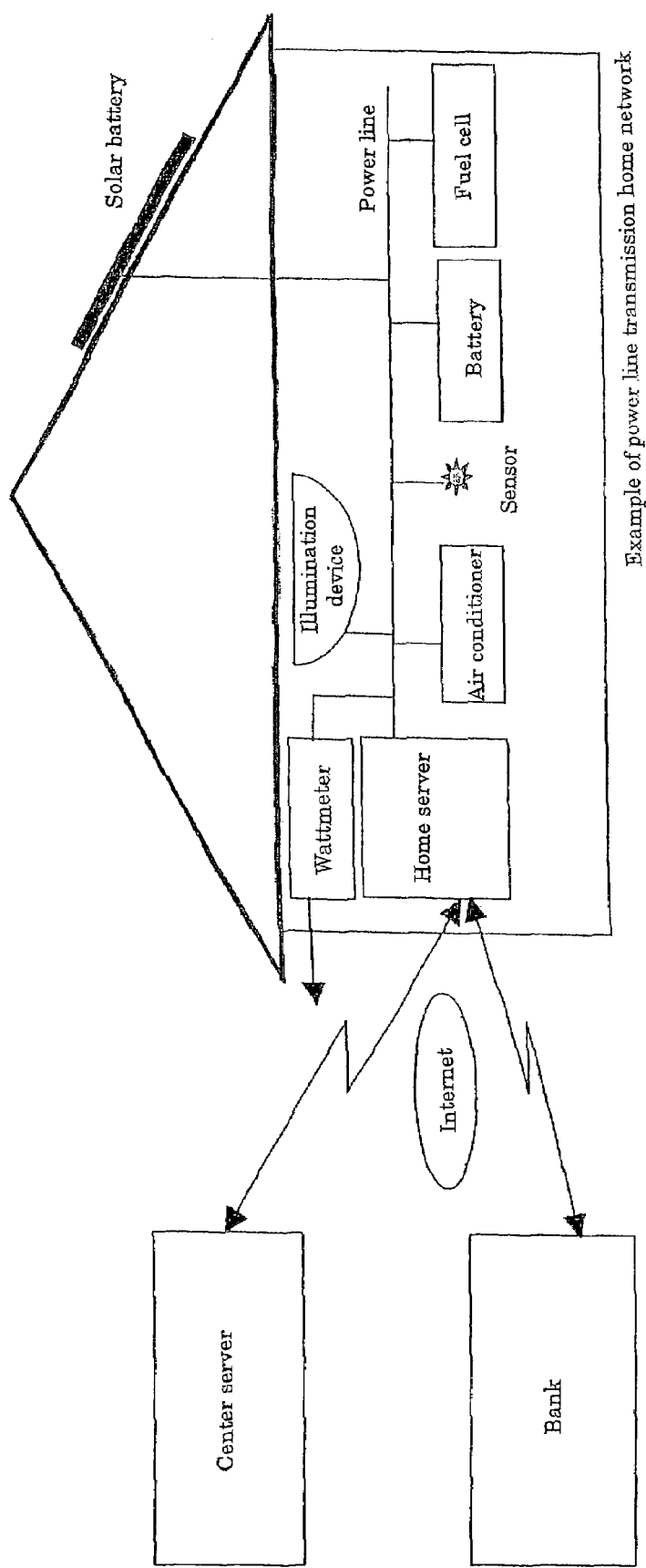
FIG. 4 is a schematic diagram illustrating a power management apparatus for home which is a facility working apparatus of a further embodiment according to the present invention.

FIG. 4 is a schematic diagram illustrating power management apparatus for home which is a working and controlling apparatus of a further embodiment according to the present invention.

This power management apparatus for home employs a home 1 as the property, employs an air conditioner, illumination device, sensor, battery, fuel battery, solar battery, and wattmeter as the facility 1a which is disposed in the property, and employs a home server as the controlling apparatus 1b which is disposed in the property. Further, the air conditioner, illumination device, sensor, battery, fuel battery, solar battery, wattmeter and home server are connected to the power line.

And, the home server 1b is connected to a center server 2b and a bank 4 via the network.

Operation and effect of the power management apparatus for home having the above arrangement are as follows.

At first, initial setup and renewal of the software in the home server are described.

(1) At Initial Setup 1. selecting initial setup menu for power management software of the home server,
2. the home server reads property information of power management software object device connected to the power line (home network) via the power line, and transfer the property information to the center server,
3. the center server makes the home server to display the power management service menu from the above information, the power management service menu being able to be used within a region.

This display is for example,

A. energy saving controlling of human detection sensor connected with an air conditioner, and illumination,
B. optimum previously cooling and heating controlling of an air conditioner based upon weather forecast information,
C. DSM controlling of an air conditioner (correspondence to leveling in power load),
D. optimum controlling for charging and discharging a battery,
E. power rates system for individual time band and season,
F. automatic settling of power rates.

4. a user selects a service to be used, and the home server transfers the selected service to the center server,
5. the center server makes the home server to display a dialogue box for determining detailed information which is necessary for using each service.

This display is for example,

A. making correspondence between the sensor and the air conditioner, illumination device,
B. the order of priority, and permissible range in determination temperature of the air conditioner objected for DSM controlling,
C. green power purchasing/non-purchasing,
D. settling bank name, branch name, account number and the like.

6. the user inputs necessary information, and the home server transfers the input information to the center server,
7. the center server generates power management service software from the above information, the software fulfilling the user's demand, and downloads the software to the home server,
8. the user is charged in correspondence to a service menu selection number by the user and a detailed information determination number.

(2) At Renewal 1. a power management software renewal menu of the home server is selected,
2. the home server transfers the property information of the power management software object device connected to the power line (home network), usage service information already determined, and its detailed determination information to the center server,
3. the center server makes the home server to display the power management service menu and the present usage service information based upon the above information, the service menu being able to be used within the region,
4. the user adds a service to be used, or cancels a service, and the home server transfers the added service or cancelled service to the center server,
5. the center server makes the home server to display a dialogue box for detailed information determination, the detailed information being required for using each service, but the information already determined is displayed within the dialogue box,
6. the user additionally inputs/modifies the information as the need arises, and the home server transfers the additionally input/modified information to the center server,
7. the center server generates power management service software from the above information, the software fulfilling the user's demand, and downloads the software to the home server,
8. the user is charged in correspondence to a service menu additional selection number by the user and a detailed information additional determination number.

After the initial setup or renewal of the software of the home server has been carried out, the power management can be carried out based upon the software which has downloaded from the center server. Of course, when the service such as the optimum previously cooling and heating controlling of an air conditioner based upon weather forecast information is selected, in the center server, for example, weather forecast information is collected from the exterior information source, the working and controlling data is generated by carrying out the predetermined processing based upon the weather forecast information, and only the working and controlling data is transferred to the home server, so that the processing load of the home server can be decreased.

Further, the power management service software is not installed for each home server at the initial stage, but only the power management service software, which is needed in correspondence to the species of the disposed facility, is downloaded from the center server. Therefore, disadvantage is prevented from occurrence that useless power management service software is installed in each home server. Also, disadvantage is prevented from occurrence that the facility, which can be disposed within the home, is restricted when the power management service software is previously installed within the home server.

Figure 5:
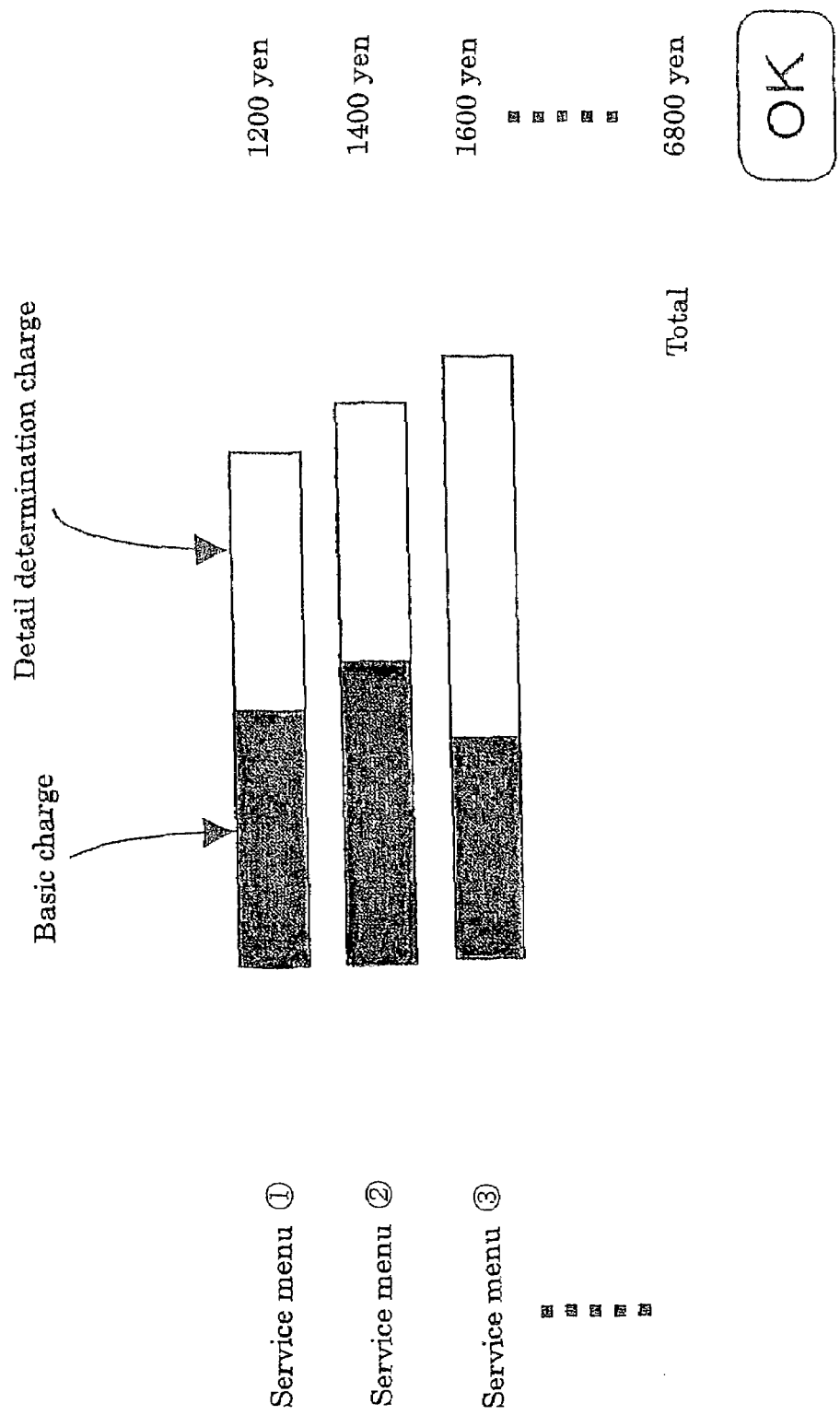
FIG. 5 is a diagram illustrating an example of a method for displaying a charge to a user.
Figure 6:
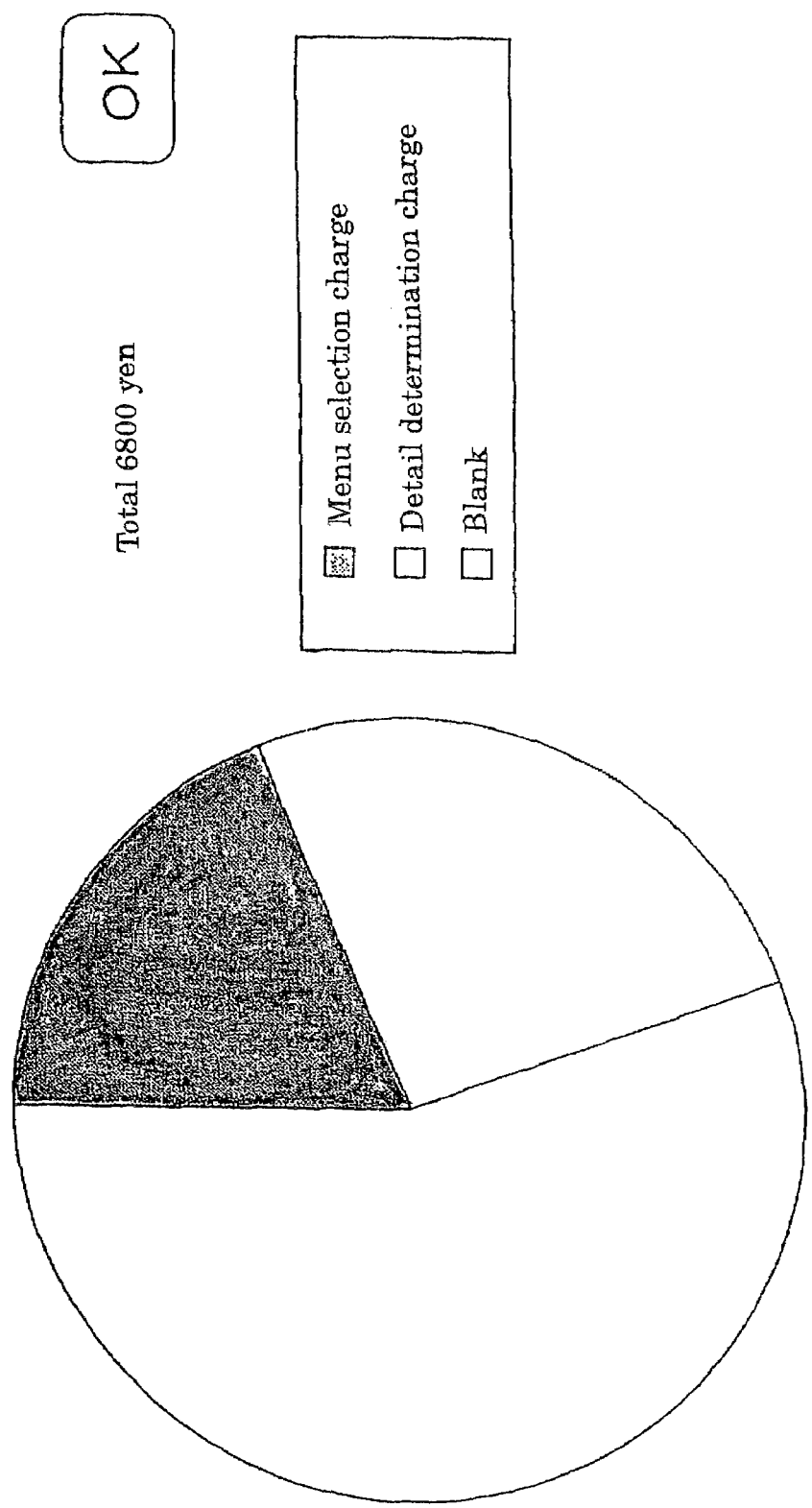
FIG. 6 is a diagram illustrating another example of a method for displaying a charge to a user.

The method for displaying the above charging to the user is exemplified as a method for carrying out bar graph displaying and total amount displaying under a condition that the basic charge and the detailed determination charge are classified for every service (refer to FIG. 5), or a method for carrying out circle graph displaying and total amount displaying under a condition that the total basic charge and the total detailed determination charge are classified for all of selected services (refer to FIG. 6). In either case, an OK button is displayed for confirming the displayed charge, therefore the total amount is charged by pressing this OK button.

Figure 7:
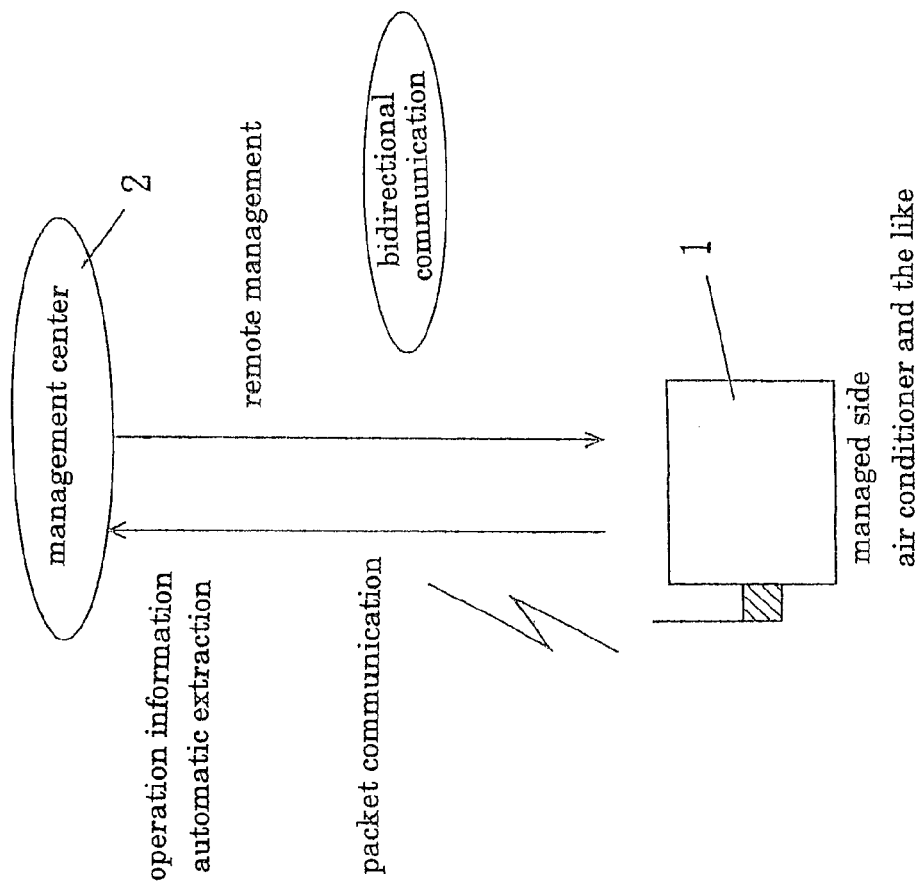
FIG. 7 is a schematic diagram illustrating a facility working system of an embodiment according to the present invention.

FIG. 7 is a schematic diagram illustrating a facility working system of an embodiment according to the present invention.

This facility working system has a management apparatus 2 such as a centralized calculation center, and a object 1 including a facility such as an air conditioner. In the object 1, operation information is automatically extracted and is transferred to the management apparatus 2. And, the object 1 is applied remote management by being transferred the facility working information from the management apparatus 2. In other words, bidirectional communication is carried out between the object 1 and the management apparatus 2.

Packet communication, internet, wireless communication, communication using a telephone line and the like are exemplified as the bidirectional communication method.

A compressor operation integration time (operation time can be integrated in the management apparatus 2), various sensor information (interior and exterior temperature, pipe temperature, pipe pressure, operation mode of valve and its similarity (open and close information, opening information) and the like), abnormal information (abnormal mode information), maintenance information (filter sign and the like), rotation number of a compressor, exterior temperature, temperature of a building body, humidity, aging of those, and the like are exemplified as the operation information.

On-off, temperature controlling (determination), air flow controlling (determination), wind direction controlling (determination), changeover cooling and warming, compressor rotation number controlling (determination) and the like are exemplified as the remote management.

Therefore, automatic detection of the operation information of the object 1 and remote management of the object 1 can be realized by carrying out bidirectional communication between the object 1 and the management apparatus 2. As a result, rapid dealing can be realized when malfunction and the like occur in the object 1, and version-up of the controlling software by the management apparatus 2 can be realized.

Further, a maintenance timing such as a filter cleaning timing, heat exchanger cleaning timing, pipe cleaning timing and the like, is estimated or judged by installing an operating and judging software, information concerning the maintenance timing is transferred to the object 1 so that the maintenance is carried out accurately.

Description is further made.

For example, the operation information of the facility 1a within the object 1 can be obtained, and information concerning maintenance timing representing corresponding maintenance to be carried out can be transferred to the object 1 when the operation integration time reaches a determination time for filter cleaning, heat exchanger cleaning, pipe cleaning or the like.

Further, it is possible that the operation information of the facility 1a included within the object 1 is obtained, the operation information is compared with the standard data for individual species of facility so as to judge whether or not the maintenance timing has reached, and information concerning maintenance timing is transferred to the object 1 in response to the judgement result representing the maintenance timing having reached. For example, judgement is made from the room temperature, exterior temperature, and compressor rotation number, and it is judged that filter cleaning timing has reached when a lower pressure is lower than the standard data. Further, the room temperature, exterior temperature, compressor rotation number, and initial operation data are compared with the standard data, and it is judged that heat exchanger cleaning timing has reached when a lower pressure is lower than the standard data.

Furthermore, the filter cleaning timing can be judged based upon lowering degree in air flow amount with respect to the initial condition, using a wind velocity sensor. The filter cleaning timing can also be judged by detecting the rotation number using a fan rotation number sensor and by calculating the difference in rotation number with respect to the initial condition.

When abnormality is generated in the facility 1a included within the object 1, diagnosis of malfunction portion, judgement whether or not operation continuation and the like are carried out by the following operation;

① transferring malfunction information, and the most recent operation data to the management apparatus 2 from the object 1, ② automatically downloading software for self diagnosis to the object 1 from the management apparatus 2, and instructing the object 1 to operate, ③ transferring the malfunction portion to the management apparatus 2 from the object 1, ④ making judgement whether or not operation is to be continued, in the management apparatus 2, ⑤ automatically downloading software for temporary operation to the object 1 from the management apparatus 2, and instructing the object 1 to operate, responding to the judgement which is made that the operation can be continued, and ⑥ carrying out repair by bringing parts for repair.

By carrying out the above series of operation, it can be minimized that the facility 1a included within the object 1 being out of operation. It is possible that the software for self diagnosis and/or software for temporary operation are held within the object 1 from the initial stage. In this case, downloading can be omitted.

Figure 8:
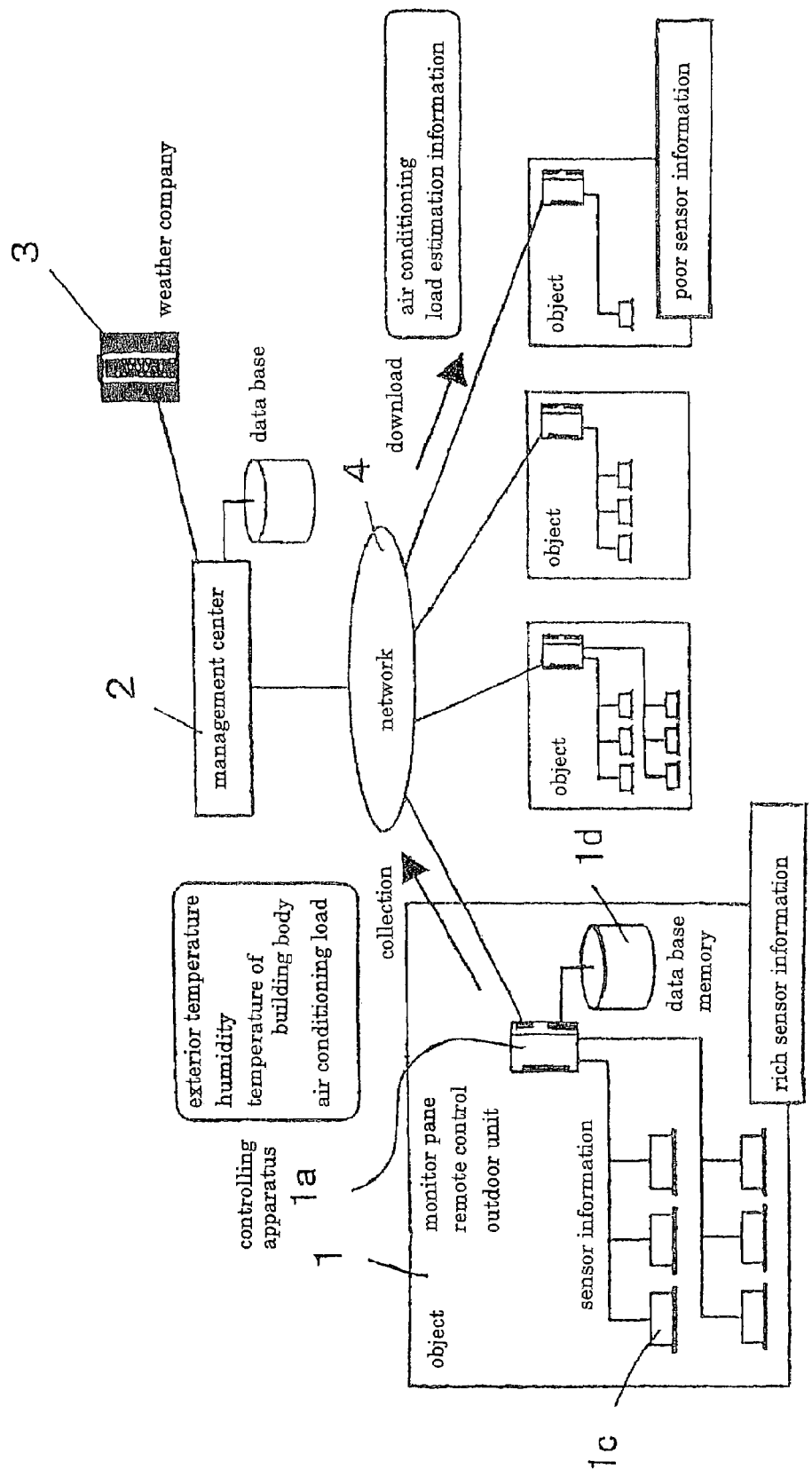
FIG. 8 is a schematic diagram illustrating a facility working system of another embodiment according to the present invention.

FIG. 8 is a schematic diagram illustrating a facility working system of another embodiment according to the present invention.

This facility working system has a management apparatus 2 such as a centralized calculation center, data base and the like, a plurality of objects 1 each including a facility 1a such as an air conditioner and the like, at least one sensor 1c, data base memory 1d and the like, an exterior information source (weather company and the like) 3 for supplying exterior information, and a network 4 for carrying out bidirectional communication. In at least partial objects 1, operation information is automatically extracted and is transferred to the management apparatus 2. In the management apparatus 2, facility working information (for example, air conditioning load estimation information and the like) is generated based upon the transferred operation information and the exterior information supplied from the exterior information source 3. The remote management is carried out for at least the other partial objects 1 by transferring the facility working information to each object 1 from the management apparatus 2. Each of some objects 1 among the objects 1 illustrated in FIG. 8 has a large number of sensors, while each of the other objects 1 has a small number of sensors.

Figure 9:
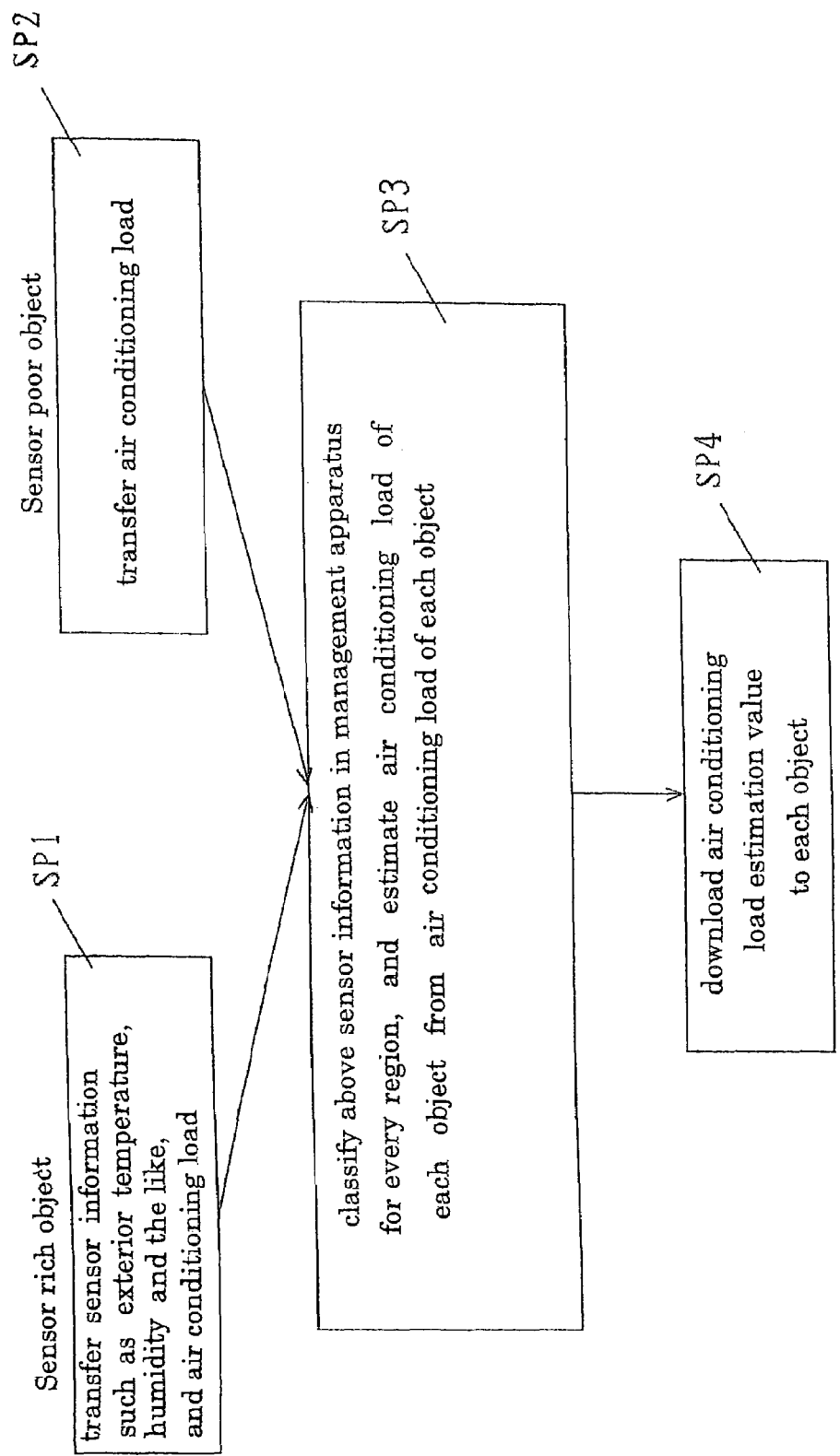
FIG. 9 is a flowchart useful in understanding the processing of the facility working system illustrated in FIG. 8.

Next, referring to the flowchart of FIG. 9, operation and effect of this facility working system are described.

In step SP1, sensor information such as an exterior temperature, humidity and the like, and an air conditioning load are transferred to the management apparatus 2 from the objects 1 having a large number of sensors. In step SP2, an air conditioning load is transferred to the management apparatus 2 from the objects 1 having a small number of sensors.

In step SP3, sensor information are classified for every region, and an air conditioning load of each object 1 is estimated from the air conditioning load of each object 1, in the management apparatus 2. In step SP4, an air conditioning load estimation value is downloaded in each object 1. Then, the series of operation is finished as it is.

Description is made further.

For example, an exterior temperature, humidity, temperature of building body, and air conditioning load information are data required for each object 1 when the air conditioning load estimation is carried out.

In the management apparatus 2, discrimination information is assigned for each property, and what kind of data being held in each object 1 and positional information of each object 1 are held.

Data such as an exterior temperature, humidity and the like for each property become identical to one another within a same region in which disturbance factor such as weather and the like rarely changes.

Due to the above, data of objects 1 having a large number of sensors (properties having rich sensor information) is collected in the management apparatus 2, and objects 1 belonging to the same region are inferred from classification based upon the discrimination information.

When the air conditioning load estimation is carried out for the objects 1 having a small number of sensors (properties having poor sensor information), the air conditioning load estimation with high accuracy is realized by carrying out the air conditioning load estimation using the data of the objects 1 having a large number of sensors and belonging to the same region.

Figure 10:
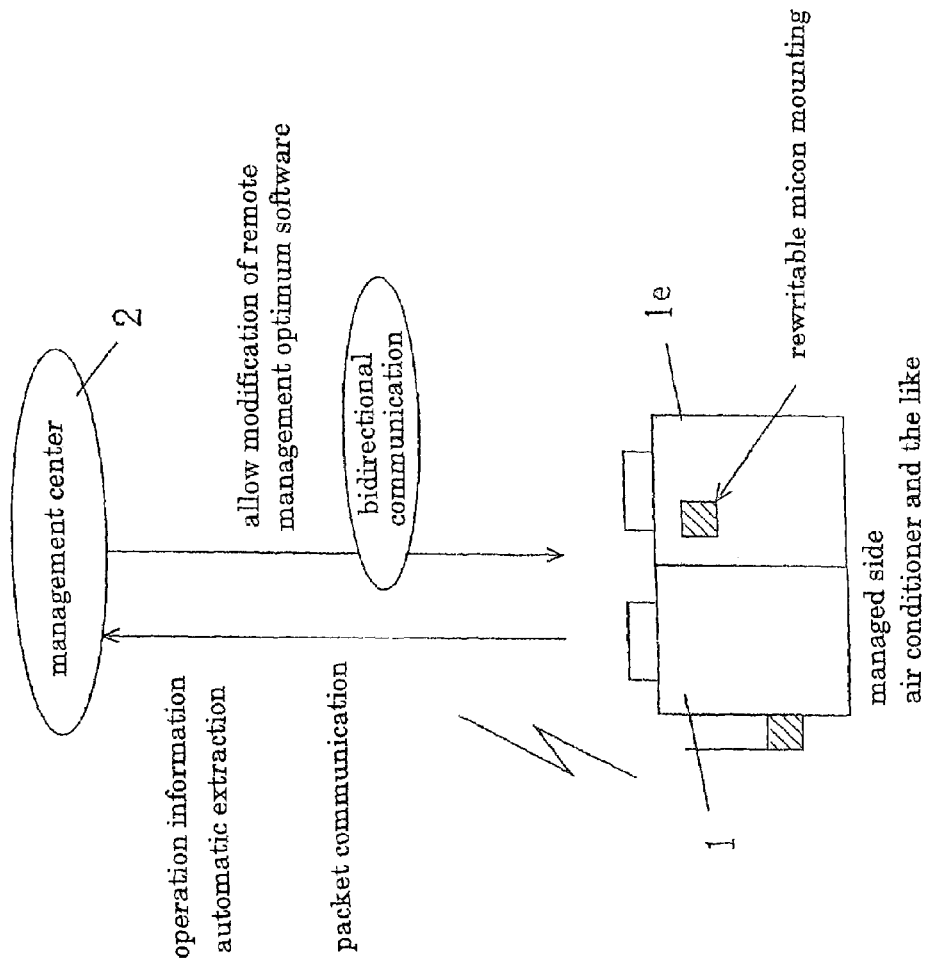
FIG. 10 is a schematic diagram illustrating a facility working system of a further embodiment according to the present invention.

FIG. 10 is a schematic diagram illustrating a facility working system of a further embodiment according to the present invention.

This facility working system is different from the facility working system of FIG. 7 in that a rewritable micon 1e is provided within the object 1.

Therefore, in this case, the optimum software is transferred from the management apparatus 2 so as to rewrite the working and controlling software within the micon 1e. As a result, the working and controlling software can be rewritten easily at any time.

In the foregoing, description was made for a case in which the network 4 for carrying out bidirectional communication. But, it is possible that a network is employed for transferring the information only from the management apparatus to the property. In this case, for example, generation of malfunction in the property is informed to the management apparatus side using a telephone or the like, and in response to this informing, the facility working information can be transferred from the management apparatus to the property via the network, the facility working information being able to deal with the malfunction.

In each of above embodiments, the information transferring is carried out between the management apparatus and the property via the network. This network is a network for carrying out information transmission between the property and the management apparatus apart from the property. Therefore, this network is different from information transmission means for carrying out only information transmission within the property (for example, means for carrying out information transmission between a wired remote control device and an air conditioner, means for carrying out information transmission between an indoor unit and an outdoor unit of an air conditioner and the like).

The invention of claim 1 has characteristic effects such that performance required for each facility can be suppressed to be low performance, and sufficient working accuracy of each facility can be maintained by processing the processing content in the management center, the processing content being not able to be processed in each facility.

The invention of claim 2 has characteristic effects such that performance required for each facility can be suppressed to be low performance, and sufficient working accuracy of each facility can be maintained by processing the processing content in the management center, the processing content being not able to be processed in each facility.

The invention of claim 3 has characteristic effects such that more accurate facility working information can be generated, in addition to the effect similar to those of claim 1 or claim 2.

The invention of claim 4 has characteristic effects such that the heat storage air conditioner or power storage air conditioner can be controlled most suitably, in addition to the effect similar to those of claim 3.

The invention of claim 5 has characteristic effects such that only necessary and sufficient facility working controlling software can be incorporated in the controlling apparatus, and restriction of facility which can be worked and controlled, can be removed by the controlling apparatus, in addition to the effect similar to those of claim 2.

The invention of claim 6 has characteristic effects such that only necessary and sufficient facility working controlling software can be incorporated in the controlling apparatus, and restriction of facility which can be worked and controlled, can be removed by the controlling apparatus, in addition to the effect similar to those of claim 2.

The invention of claim 7 has characteristic effects such that a charge amount can be laid which corresponds the decreased amount in working cost, in addition to the effect similar to those of one of claims 1-6.

The invention of claim 8 has characteristic effects such that performance required for each facility can be suppressed to be low performance, and sufficient working accuracy of each facility can be maintained by processing the processing content in the management center, the processing content being not able to be processed in each facility.

The invention of claim 9 has characteristic effects such that performance required for each facility can be suppressed to be low performance, and sufficient working accuracy of each facility can be maintained by processing the processing content in the management center, the processing content being not able to be processed in each facility.

The invention of claim 10 has characteristic effects such that more accurate facility working information can be generated, in addition to the effect similar to those of claim 8 or claim 9.

The invention of claim 11 has characteristic effects such that the heat storage air conditioner or power storage air conditioner can be controlled most suitably, in addition to the effect similar to those of claim 10.

The invention of claim 12 has characteristic effects such that only necessary and sufficient facility working controlling software can be incorporated in the controlling apparatus, and restriction of facility which can be worked and controlled, can be removed by the controlling apparatus, in addition to the effect similar to those of claim 9.

The invention of claim 13 has characteristic effects such that only necessary and sufficient facility working controlling software can be incorporated in the controlling apparatus, and restriction of facility which can be worked and controlled, can be removed by the controlling apparatus, in addition to the effect similar to those of claim 9.

The invention of claim 14 has characteristic effects such that a charge amount can be laid which corresponds the decreased amount in working cost, in addition to the effect similar to those of one of claims 8-13.

The invention of claim 15 has characteristic effects such that performance required for each facility can be suppressed to be low performance, and sufficient working accuracy of each facility can be maintained by processing the processing content in the management center, the processing content being not able to be processed in each facility.

The invention of claim 16 has characteristic effects such that facility working information with high function or high quality can be obtained by carrying out processing based upon facility information of a facility with high function, when facilities with high function and facilities with low function exist, and working with high function or high quality can be performed based upon the facility working information with high function or high quality for facilities with low function.

The invention of claim 17 has characteristic effects such that an average facility working can be carried out even when a part of facilities transfer unique facility information.

The invention of claim 18 has characteristic effects such that performance required for each facility can be suppressed to be low performance, and sufficient working accuracy of each facility can be maintained by processing the processing content in the management center, the processing content being not able to be processed in each facility, and each facility can be discriminated.

The invention of claim 19 has characteristic effects such that performance required for each facility can be suppressed to be low performance, and sufficient working accuracy of each facility can be maintained by processing the processing content in the management center, the processing content being not able to be processed in each facility.

The invention of claim 20 has characteristic effects such that performance required for each facility can be suppressed to be low performance, and sufficient working accuracy of other facilities can be maintained by processing the processing content in the management center, the processing content being not able to be processed in each facility.

The invention of claim 21 has characteristic effects such that driving and controlling based upon the facility working information can be carried out, in addition to the effect similar to those of one of claims 15-20.

The invention of claim 22 has characteristic effects such that the effect similar to those of one of claims 15-21 can be realized when the air conditioner is driven and controlled.

The invention of claim 23 has characteristic effects such that the heat storage air conditioner or power storage air conditioner can be driven and controlled using the facility working information in addition to the effect similar to those of one of claims 15-21.

The invention of claim 24 has characteristic effects such that the facility can be driven and controlled by storing the facility working information in the memory device, and transfer frequency of the facility working information can be decreased, in addition to the effect similar to those of one of claims 15-23.

The invention of claim 25 has characteristic effects such that the facility can be driven and controlled by storing the most recent facility working information in the memory device, and transfer frequency of the facility working information can be decreased, in addition to the effect similar to those of one of claims 15-23.

The invention of claim 26 has characteristic effects such that the facility can be driven and controlled by the controlling apparatus by transferring the facility working controlling software to the facility from the management apparatus, and consequently a capacity required for the controlling apparatus can be decreased, and version-up can easily be dealt with, in addition to the effect similar to those of one of claims 15-25.

The invention of claim 27 has characteristic effects such that the effect similar to those of one of claims 15-26 can be realized.

The invention of claim 28 has characteristic effects such that the effect similar to those of one of claims 15-27 can be realized.

The invention of claim 29 has characteristic effects such that the facility can be worked and controlled with high accuracy by obtaining the facility working information with high accuracy, in addition to the effect similar to those of one of claims 15-28.

The invention of claim 30 has characteristic effects such that the processing in the management apparatus can be simplified, in addition to the effect similar to those of one of claims 15-29.

The invention of claim 31 has characteristic effects such that laying a charge corresponding to actual working cost merit can be carried out, in addition to the effect similar to those of one of claims 15-30.

The invention of claim 32 has characteristic effects such that maintenance of the facility can be carried out precisely, in addition to the effect similar to those of one of claims 15-22.

The invention of claim 33 has characteristic effects such that maintenance of the facility can be carried out precisely based upon the integration driving time, in addition to the effect similar to those of claim 32.

The invention of claim 34 has characteristic effects such that maintenance of the facility can be carried out precisely responding to the kinds of facility, in addition to the effect similar to those of claim 32.

The invention of claim 35 has characteristic effects such that maintenance of the facility can be carried out precisely based upon the variation in facility driving information, in addition to the effect similar to those of claim 32.

The invention of claim 36 has characteristic effects such that cleaning of the filter can be carried out precisely, in addition to the effect similar to those of claim 32.

The invention of claim 37 has characteristic effects such that sufficient working accuracy of each facility can be maintained by processing the processing content in the management center, the processing content being not able to be processed in each facility.

The invention of claim 38 has characteristic effects such that facility working information with high function or high quality can be obtained by carrying out processing based upon facility information of a facility with high function, when facilities with high function and facilities with low function exist, and working with high function or high quality can be performed based upon the facility working information with high function or high quality for facilities with low function.

The invention of claim 39 has characteristic effects such that an average facility working can be carried out even when a part of facilities transfer unique facility information.

The invention of claim 40 has characteristic effects such that performance required for each facility can be suppressed to be low performance, and sufficient working accuracy of each facility can be maintained by processing the processing content in the management center, the processing content being not able to be processed in each facility, and each facility can be discriminated.

The invention of claim 41 has characteristic effects such that performance required for each facility can be suppressed to be low performance, and sufficient working accuracy of each facility can be maintained by processing the processing content in the management center, the processing content being not able to be processed in each facility.

The invention of claim 42 has characteristic effects such that sufficient working accuracy of other facilities can be maintained by processing the processing content in the management center, the processing content being not able to be processed in each facility.

The invention of claim 43 has characteristic effects such that the effect similar to those of one of claims 37-42 can be realized when the air conditioner is driven and controlled.

The invention of claim 44 has characteristic effects such that the heat storage air conditioner or power storage air conditioner can be driven and controlled using the facility working information in addition to the effect similar to those of one of claims 37-42.

The invention of claim 45 has characteristic effects such that the facility can be driven and controlled by the controlling apparatus by transferring the facility working controlling software to the facility from the management apparatus, and consequently version-up can easily be dealt with, in addition to the effect similar to those of one of claims 37-44.

The invention of claim 46 has characteristic effects such that the facility can be worked and controlled with high accuracy by obtaining the facility working information with high accuracy, in addition to the effect similar to those of one of claims 37-45.

The invention of claim 47 has characteristic effects such that the processing in the management apparatus can be simplified, in addition to the effect similar to those of one of claims 37-46.

The invention of claim 48 has characteristic effects such that actual working cost merit can be calculated, in addition to the effect similar to those of one of claims 37-47.

The invention of claim 49 has characteristic effects such that maintenance of the facility can be carried out precisely, in addition to the effect similar to those of one of claims 37-43.

The invention of claim 50 has characteristic effects such that maintenance of the facility can be carried out precisely using the integration driving time, in addition to the effect similar to those of claim 49.

The invention of claim 51 has characteristic effects such that maintenance of the facility can be carried out precisely responding to the kinds of facility, in addition to the effect similar to those of claim 49.

The invention of claim 52 has characteristic effects such that maintenance of the facility can be carried out precisely based upon the variation in facility driving information, in addition to the effect similar to those of claim 49.

The invention of claim 53 has characteristic effects such that cleaning of the filter can be carried out precisely, in addition to the effect similar to those of claim 49.

The invention of claim 54 has characteristic effects such that sufficient working accuracy of the facility can be maintained by processing the processing content in the management center, the processing content being not able to be processed in the facility.

The invention of claim 55 has characteristic effects such that sufficient working accuracy of each facility can be maintained by processing the processing content in the management center, the processing content being not able to be processed in each facility, and each facility can be discriminated by the management apparatus.

The invention of claim 56 has characteristic effects such that driving and controlling based upon the facility working information can be carried out, in addition to the effect similar to those of claim 54 or claim 55.

The invention of claim 57 has characteristic effects such that the effect similar to those of one of claims 54-56 can be realized when the air conditioner is driven and controlled.

The invention of claim 58 has characteristic effects such that the heat storage air conditioner or power storage air conditioner can be driven and controlled using the facility working information, in addition to the effect similar to those of one of claims 54-56.

The invention of claim 59 has characteristic effects such that receiving frequency of the facility working information can be decreased, in addition to the effect similar to those of one of claims 54-58.

The invention of claim 60 has characteristic effects such that the facility can be driven and controlled based upon the most recent facility working information, and transfer frequency of the facility working information can be decreased, in addition to the effect similar to those of one of claims 54-58.

The invention of claim 61 has characteristic effects such that the facility can be driven and controlled by the facility working controlling software, and consequently version-up can easily be dealt with, in addition to the effect similar to those of one of claims 54-60.

The invention of claim 62 has characteristic effects such that the effect similar to those of one of claims 54-61 can be realized.

The invention of claim 63 has characteristic effects such that the effect similar to those of one of claims 54-62 can be realized.

The invention of claim 64 has characteristic effects such that actual working cost merit can be calculated, in addition to the effect similar to those of one of claims 54-63.

The invention of claim 65 has characteristic effects such that maintenance can be carried out precisely, in addition to the effect similar to those of one of claims 54-57.

The invention of claim 66 has characteristic effects such that maintenance can be carried out precisely using the integration driving time, in addition to the effect similar to those of claim 65.

The invention of claim 67 has characteristic effects such that maintenance can be carried out precisely responding to the kinds of facility, in addition to the effect similar to those of claim 65.

The invention of claim 68 has characteristic effects such that maintenance can be carried out precisely based upon the variation in facility driving information, in addition to the effect similar to those of claim 65.

The invention of claim 69 has characteristic effects such that cleaning of the filter can be carried out precisely, in addition to the effect similar to those of claim 65.

The invention of claim 70 has characteristic effects such that performance required for each facility can be suppressed to be low performance, and sufficient working accuracy of each facility can be maintained by processing the processing content in the management center, the processing content being not able to be processed in each facility.

The invention of claim 71 has characteristic effects such that facility working information with high function or high quality can be obtained by carrying out processing based upon facility information of a facility with high function, when facilities with high function and facilities with low function exist, and working with high function or high quality can be performed based upon the facility working information with high function or high quality for facilities with low function.

The invention of claim 72 has characteristic effects such that an average facility working can be carried out even when a part of facilities transfer unique facility information.

The invention of claim 73 has characteristic effects such that performance required for each facility can be suppressed to be low performance, and sufficient working accuracy of each facility can be maintained by processing the processing content in the management center, the processing content being not able to be processed in each facility.

The invention of claim 74 has characteristic effects such that facility working information with high function or high quality can be obtained by carrying out processing based upon facility information of a facility with high function, when facilities with high function and facilities with low function exist, and working with high function or high quality can be performed based upon the facility working information with high function or high quality for facilities with low function.

The invention of claim 75 has characteristic effects such that an average facility working can be carried out even when a part of facilities transfer unique facility information.

The invention of claim 76 has characteristic effects such that performance required for each facility can be suppressed to be low performance, and sufficient working accuracy of each facility can be maintained by processing the processing content in the management center, the processing content being not able to be processed in each facility.

The invention of claim 77 has characteristic effects such that performance required for each facility can be suppressed to be low performance despite a condition that information transferring from the facility to the management apparatus is allowed or not, and sufficient working accuracy of each facility can be maintained by processing the processing content in the management center, the processing content being not able to be processed in each facility.

The invention of claim 78 has characteristic effects such that driving and controlling of the facility can be carried out by storing the most recent facility working information in the memory device, and transferring frequency of the facility working information can be decreased, in addition to the effect similar to those of claim 77.

The invention of claim 79 has characteristic effects such that the facility can be driven and controlled by the controlling apparatus by transferring the facility working controlling software to the facility from the management apparatus, and consequently a capacity required for the controlling apparatus can be decreased, and version-up can easily be dealt with, in addition to the effect similar to those of claim 77 or claim 78.

The invention of claim 80 has characteristic effects such that the effect similar to those of one of claims 77-79 can be realized when the air conditioner is driven and controlled.

The invention of claim 81 has characteristic effects such that the performance required for each facility can be suppressed to be low performance despite a condition that information transferring from the facility to the management apparatus is allowed or not, and sufficient working accuracy of each facility can be maintained by processing the processing content in the management center, the processing content being not able to be processed in each facility.

The invention of claim 82 has characteristic effects such that driving and controlling of the facility can be carried out by storing the most recent facility working information in the memory device, and transferring frequency of the facility working information can be decreased, in addition to the effect similar to those of claim 81.

The invention of claim 83 has characteristic effects such that the facility can be driven and controlled by the controlling apparatus by transferring the facility working controlling software to the facility from the management apparatus, and consequently a capacity required for the controlling apparatus can be decreased, and version-up can easily be dealt with, in addition to the effect similar to those of claim 81 or 82.

The invention of claim 84 has characteristic effects such that the effect similar to those of one of claims 81-83 can be realized when the air conditioner is driven and controlled.

The invention of claim 85 has characteristic effects such that performance required for each facility can be suppressed to be low performance despite a condition that information transferring from the facility to the management apparatus is allowed or not, and sufficient working accuracy of each facility can be maintained by processing the processing content in the management center, the processing content being not able to be processed in each facility.

The invention of claim 86 has characteristic effects such that driving and controlling of the facility can be carried out by storing the most recent facility working information in the memory device, and transferring frequency of the facility working information can be decreased, in addition to the effect similar to those of claim 85.

The invention of claim 87 has characteristic effects such that the facility can be driven and controlled by the controlling apparatus by transferring the facility working controlling software to the facility from the management apparatus, and consequently a capacity required for the controlling apparatus can be decreased, and version-up can easily be dealt with, in addition to the effect similar to those of claim 85 or 86.

The invention of claim 88 has characteristic effects such that the effect similar to those of one of claims 85-87 can be realized when the air conditioner is driven and controlled.

The invention of claim 89 has characteristic effects such that performance required for each facility can be suppressed to be low performance despite a condition that information transferring from the facility to the management apparatus is allowed or not, and sufficient working accuracy of each facility can be maintained by processing the processing content in the management center, the processing content being not able to be processed in each facility.

The invention of claim 90 has characteristic effects such that performance required for each facility can be suppressed to be low performance despite a condition that information transferring from the facility to the management apparatus is allowed or not, and sufficient working accuracy of each facility can be maintained by processing the processing content in the management center, the processing content being not able to be processed in each facility.

The invention of claim 91 has characteristic effects such that performance required for each facility can be suppressed to be low performance despite a condition that information transferring from the facility to the management apparatus is allowed or not, and sufficient working accuracy of each facility can be maintained by processing the processing content in the management center, the processing content being not able to be processed in each facility.

What is claimed is:

1. A working method for a facility at a system having a control apparatus for said facility and a management center connected to said control apparatus via a network, comprising the steps of:

extracting facility information of said facility and transmitting the facility information of said facility to said management center by said control apparatus;

transmitting available service information obtained on the basis of said facility information to said control apparatus by said management center;

displaying said service information for selection by a customer by said control apparatus;

transmitting a selected service to said management center by said control apparatus;

transmitting a display for setting detailed information necessary for utilizing said selected service to said control apparatus by said management center;

displaying said display by said control apparatus, and transmitting set detailed information to said management center;

making management control software based upon said selected service and said set detailed information, and transmitting the management control software to said control apparatus by said management center; and working said facility in correspondence to said selected service and said set detailed information by executing said management control software by said control apparatus.

2. A working method for said facility as set forth in claim 1, further comprising the steps of:

calculating charges for said selected services based upon said selected service and said set detailed information and transmitting the charges to said control apparatus by said management center; and displaying said charges together with an OK button for confirming by said control apparatus.

3. A working method for a plurality of facilities at a system having a control apparatus of said plurality of facilities and a management center connected to said control apparatus via a network, comprising the steps of:

extracting facility information of each of said plurality of facilities and transmitting the facility information of said facility to said management center by said control apparatus;

transmitting available service information obtained on the basis of said facility information to said control apparatus by said management center;

displaying said service information for selection by a customer by said control apparatus;

transmitting a selected service to said management center by said control apparatus;

transmitting a display for setting detailed information necessary for utilizing said selected service to said control apparatus by said management center;

displaying said display by said control apparatus, and transmitting set detailed information to said management center;

making management control software based upon said selected service and said set detailed information, and transmitting the management control software to said control apparatus by said management center; and working said plurality of facilities in correspondence to said selected service and said set detailed information by executing said management control software by said control apparatus.

* * * * *